(12) United States Patent
Talwar et al.

(10) Patent No.: US 9,338,027 B2
(45) Date of Patent: May 10, 2016

(54) VOICEMAIL PROXY SERVER

(75) Inventors: Mohit Talwar, Palo Alto, CA (US); Miladin Pavlicic, Sammamish, WA (US); Siddharth Murlidhar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 33 days.

(21) Appl. No.: 13/330,084

(22) Filed: Dec. 19, 2011

(65) Prior Publication Data

US 2013/0156167 A1   Jun. 20, 2013

(51) Int. Cl.
| | |
|---|---|
| H04M 1/64 | (2006.01) |
| H04L 12/58 | (2006.01) |
| H04M 3/533 | (2006.01) |
| H04M 3/42 | (2006.01) |
| H04M 7/00 | (2006.01) |

(52) U.S. Cl.
CPC ......... *H04L 12/586* (2013.01); *H04M 3/53325* (2013.01); *H04M 3/53333* (2013.01); *H04L 12/589* (2013.01); *H04M 3/42382* (2013.01); *H04M 7/0024* (2013.01); *H04M 7/0033* (2013.01); *H04M 2201/16* (2013.01); *H04M 2207/18* (2013.01)

(58) Field of Classification Search
CPC ..... H04M 3/537; H04M 3/533; H04M 3/493; H04M 11/085; H04M 11/066
USPC ...................... 379/88.13, 88.14, 88.22–88.25
See application file for complete search history.

(56) References Cited

U.S. PATENT DOCUMENTS

| | | | | |
|---|---|---|---|---|
| 6,640,239 | B1 * | 10/2003 | Gidwani | H04L 29/06027 370/353 |
| 7,110,510 | B1 * | 9/2006 | Shaffer | H04M 3/533 379/88.25 |
| 7,460,654 | B1 * | 12/2008 | Jenkins | H04M 3/533 379/88.25 |
| 7,640,293 | B2 * | 12/2009 | Wilson et al. | 709/203 |
| 7,660,329 | B2 | 2/2010 | Ossa | |
| 7,702,315 | B2 * | 4/2010 | Engstrom et al. | 455/412.1 |
| 7,978,828 | B1 * | 7/2011 | Edamadaka et al. | 379/88.13 |
| 2002/0073142 | A1 * | 6/2002 | Moran | 709/203 |
| 2004/0156485 | A1 * | 8/2004 | Poustchi | H04M 1/006 379/88.14 |
| 2004/0202117 | A1 | 10/2004 | Wilson | |
| 2005/0216300 | A1 | 9/2005 | Appelman et al. | |
| 2006/0085504 | A1 | 4/2006 | Yang et al. | |
| 2006/0271630 | A1 | 11/2006 | Bensky et al. | |
| 2007/0033250 | A1 | 2/2007 | Levin et al. | |
| 2007/0207785 | A1 * | 9/2007 | Chatterjee et al. | 455/414.1 |
| 2008/0037721 | A1 * | 2/2008 | Yao et al. | 379/88.11 |
| 2008/0125146 | A1 | 5/2008 | Bainbridge | |
| 2008/0200152 | A1 | 8/2008 | Moore | |
| 2009/0061827 | A1 * | 3/2009 | Bulgin | H04M 1/6505 455/413 |
| 2009/0112782 | A1 | 4/2009 | Cross et al. | |
| 2009/0141875 | A1 | 6/2009 | Demmitt et al. | |
| 2010/0074424 | A1 * | 3/2010 | Ito | 379/142.04 |
| 2010/0120403 | A1 | 5/2010 | Willey | |
| 2010/0210291 | A1 | 8/2010 | Lauer et al. | |

(Continued)

*Primary Examiner* — Simon Sing

(74) *Attorney, Agent, or Firm* — Baker Botts L.L.P.

(57) ABSTRACT

Methods and systems directed to retrieving voicemails from a voice mailbox server. In particular embodiments, a mailbox server may receive a notification from the voice mailbox server and connect to the voice mailbox server providing the credentials of a client device, and pull new voicemails for storage at the mailbox server. In particular embodiments, mailbox server periodically polls voice mailbox server for new voicemail messages. In particular embodiments, a client device polls or receives notification of new voicemails, and transmits a downloaded message to the mailbox server.

18 Claims, 17 Drawing Sheets

(56) References Cited

U.S. PATENT DOCUMENTS

| | | |
|---|---|---|
| 2010/0285778 A1 | 11/2010 | Bluvband et al. |
| 2010/0322393 A1* | 12/2010 | Jin .................. H04M 3/537 379/88.12 |
| 2011/0145192 A1 | 6/2011 | Quintela et al. |
| 2011/0166941 A1 | 7/2011 | Sutton-Shearer |
| 2012/0210334 A1 | 8/2012 | Sutedja et al. |
| 2013/0064357 A1* | 3/2013 | Hao .................. H04M 3/53333 379/88.11 |
| 2013/0121481 A1* | 5/2013 | Mikan et al. ............... 379/88.14 |
| 2013/0157627 A1 | 6/2013 | Talwar |

* cited by examiner

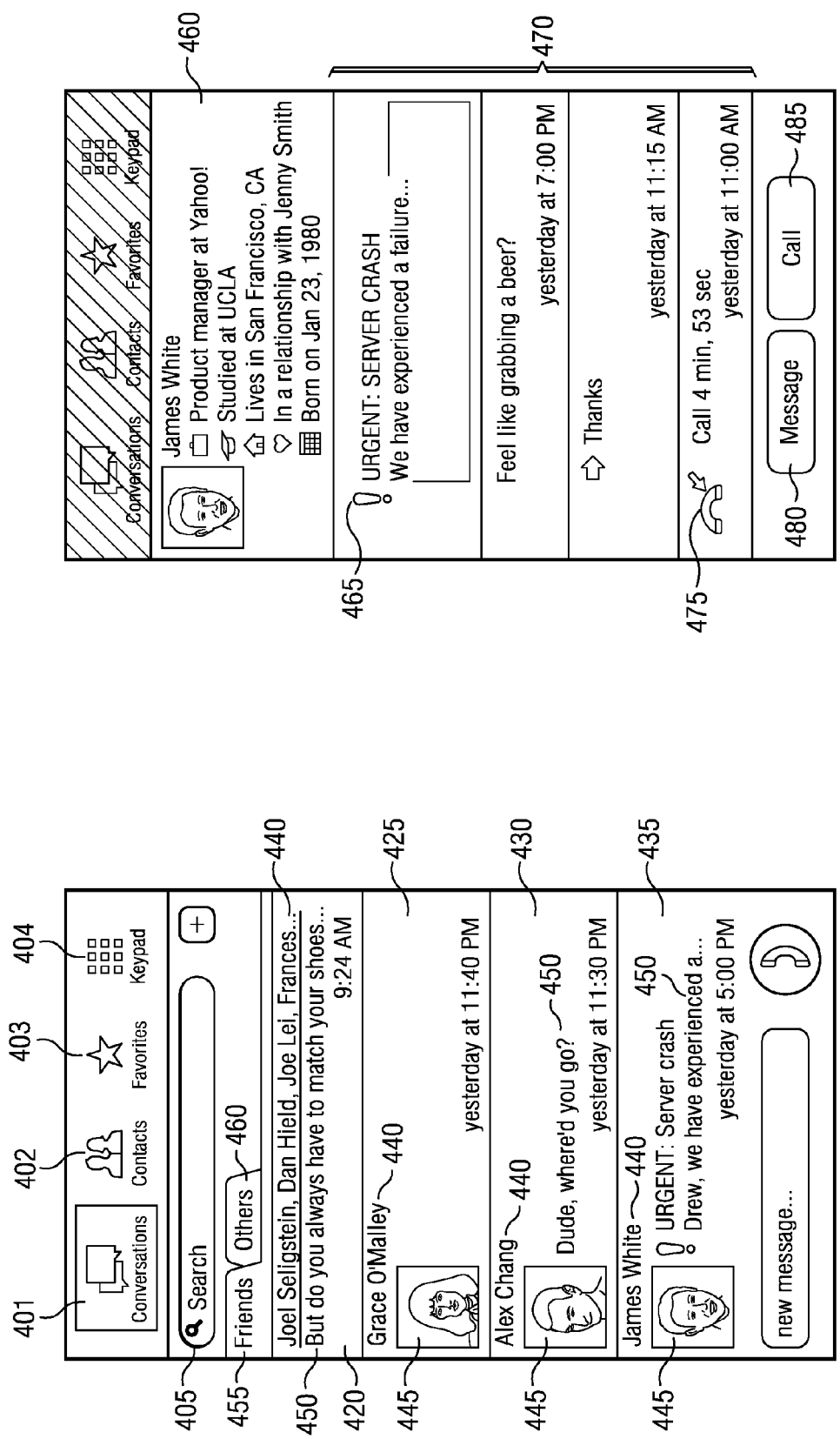

US 9,338,027 B2

VOICEMAIL PROXY SERVER

TECHNICAL FIELD

The present disclosure relates generally to wireless message transmission.

BACKGROUND

The advent of social networking, instant messaging, and ubiquitous wireless data networks allows individuals to select from a plurality of methods to communicate with their contacts. In the past, communications between individuals were limited to physical mail, wired telephones, fax, and wireless telephones. However, with the expansion of the Internet, coupled with mobile devices capable of maintaining a data connection to the Internet, users may select from a plethora of communications means, such as: cellular phone calls, e-mail to multiple accounts, multiple instant messaging protocols, twitter messages, voice-over-IP (VoIP) calls, video chats, SMS and MMS messages, social networking messages, voicemail, push-to-talk (PTT), and dedicated notification-based message clients such as the Blackberry Messenger and Kik Messenger. Typically, users are less concerned by the actual communications method used with their contacts, and more concerned with the content of the communication and to or from whom it was conveyed.

Mobile devices such as mobile phones, tablets, and personal computers often communicate through wireless networks provided by cellular carriers. Modern 3 G and 4 G networks, both CMDA2000-based and GPRS-based, permit simultaneous access of wireless data through the packet-switched portion of its wireless cellular network and voice data through the circuit-switched portion of its wireless cellular network. Modern wireless cellular networks permit simultaneous communication through the packet-switched data portion of their networks and through their short message service (SMS) channels. Additionally, wireless devices may also communicate through one or more wireless LANs, such as 802.11 WiFi networks. Based on service coverage and the location of a wireless device, a given wireless device may have varying degrees of connectivity. Typically, users are less concerned with the actual data channel used to deliver or receive a message, and more concerned with the content of the communication and to or from whom it was conveyed.

BRIEF DESCRIPTION OF THE DRAWINGS

FIG. 4A illustrates an example interface implementing a conversations view.

FIG. 4B illustrates an example interface for viewing a particular conversation.

DETAILED DESCRIPTION OF EXAMPLE EMBODIMENT(S)

Overview

Figure 1:
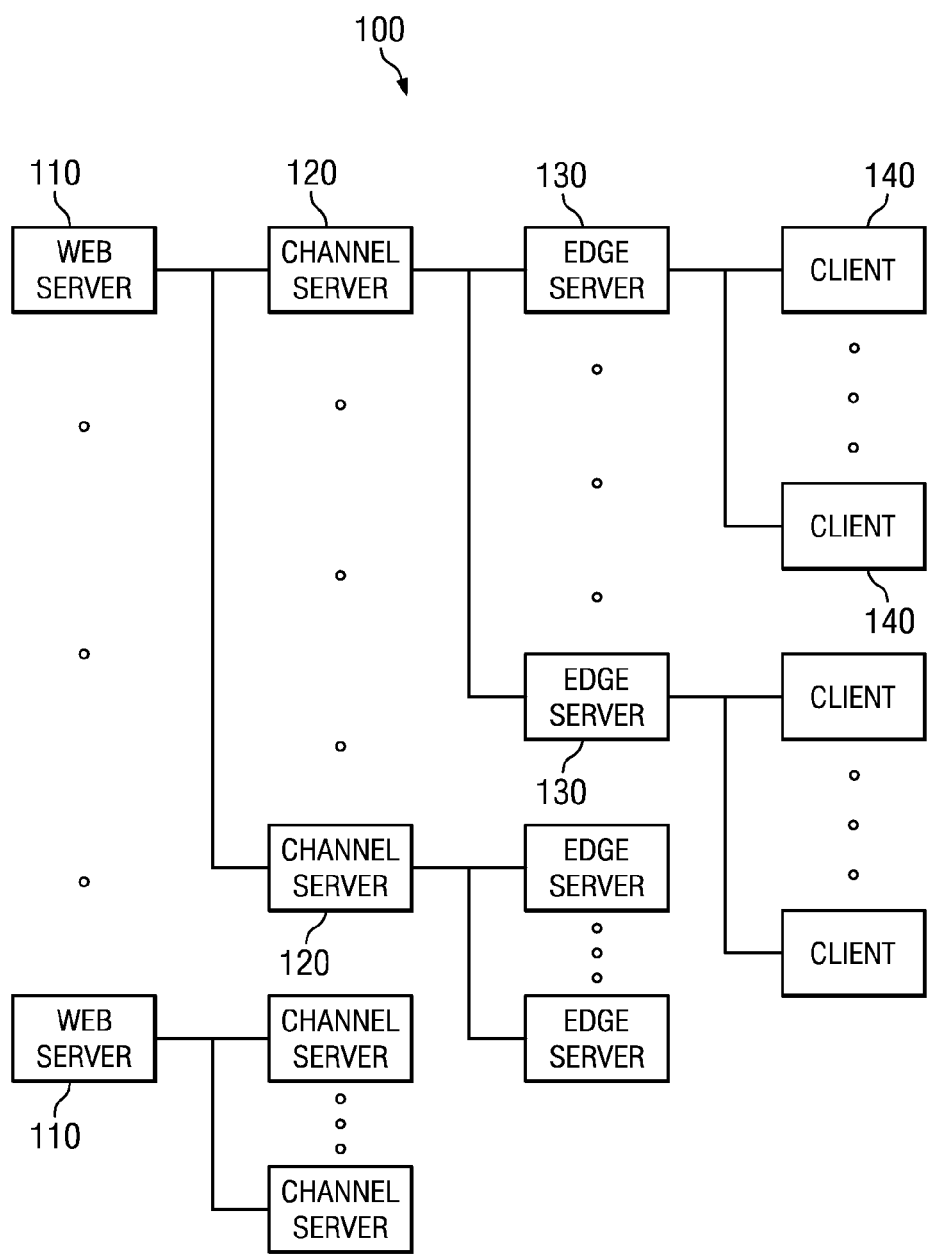
FIG. 1 illustrates an example client-server environment.

This disclosure generally relates to transmitting data of disparate communication protocols or data channels between two or more client devices via an intermediate messaging service that aggregates all the communications into a single communications thread, regardless of type or transport channel.

In particular embodiments, the messaging service applies or more policies to messages transmitted from or to client devices dictating the mode of transmission for a particular device. In particular embodiments, where policies dictate transmitting a message via SMS, a MS server of the messaging service transmits the SMS to the carrier recipient via a special bind, allowing the message to appear as if it initiated from the transmitting device rather than the SMS server. In particular embodiments, the transmitting client device transmits the message via SMS after explicit instruction from the messaging service.

In particular embodiments, the messaging service connects directly to client device's voicemail boxes and download voicemails to the messaging service backend servers. In particular embodiments, client devices download the voicemails from their carrier voice mailbox and transmit them up to the messaging service backend server for aggregation.

In particular embodiments, the messaging service provides a common short code (CSC) that is in direct connection with the messaging servers. A client device lacking a data connection may transmit a message as an SMS to the CSC, after which the messaging service may deliver the message in accordance with one or more recipient policies.

These and other features, aspects, and advantages of the disclosure are described in more detail below in the detailed description and in conjunction with the following figures.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Notification Channel

In network communications, one device may "push" a communication to another device. In particular embodiments, with push technology, the sending device typically initiates the communication transaction and may transmit the communication to the receiving device without obtaining a permission from the receiving device first. In other words, the communication is "pushed" to the receiving device whether or not the receiving device actually wants to receive the communication.

Push technology may be used under various circumstances. For example, in a client-server environment, a server may push communications to a client. The client may be any type of electronic device capable of network communications. In particular embodiments, the client may be a mobile device (e.g., a mobile telephone, a smart phone, a tablet computer, etc.) capable of wireless communications, and the server may push communications, sent over a mobile network or a wireless network, to the mobile client. Alternatively or in addition, in particular embodiments, the client may be a non-mobile computing device (e.g., a desktop computer) capable of connecting to a computer network through a wired connection (e.g., an Ethernet connection). The server may push communications to the non-mobile client over the computer network (e.g., the Internet).

In particular embodiments, a social-networking system implemented, for example, as a social-networking website, may push communications to the client devices of its users. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

In order to maintain connectivity with its users, a social networking system may maintain a constant open connection with each of the mobile devices associated with a particular user account. This open data connection allows the social networking system to push notifications to client devices, the client devices to request content from the social networking system, and the client devices to transmit information back to the social networking system servers. For example, a client device may wish to constantly update the social networking system of its location. As another example, the client device may wish to perform some sort of action on the social network, and may request, through HTTP or another suitable protocol, a web page for performing the specific action. In other cases, the social networking system may wish to push a notification of a message from one social networking user to another. In particular embodiments, this open data connection utilizes a TCP/IP connection. In particular embodiments, the open data connection utilizes a VPN tunnel, such as in Microsoft Direct Push. In particular embodiments, the open data connection utilizes the SMS channels for push notifications. This disclosure contemplates any suitable manner of maintaining an open connection for unidirectional or bidirectional communication between a social networking system and a client device.

FIG. 1 illustrates an example client-server environment 100 in which a communication may be received from or pushed to a client device. In particular embodiments, the client device may be a mobile device associated with a user. There may be any number of servers 110, 120, 130 of various types and any number of clients 140 of various types. Each server 110, 120, or 130 may include hardware, software, or embedded logic components or a combination of two or more such components for carrying out the appropriate functionalities implemented or supported by server 110, 120, or 130. In particular embodiments, servers 110, 120, and 130 may be arranged in tiers. For example, there may be one or more web servers 110 for hosting a social-networking website. Each web server 110 may be connected with one or more channel servers 120. Each channel server 120 may be connected with one or more edge servers 130. Web servers 110, channel servers 120, and edge servers 130 may each perform some of the functionalities or operations supported by the social-networking website. For example, web servers 110 may host a network application or a web-based application, such as a social-networking application or website. Channel servers 120 may monitor and manage the available communication channels (e.g., media downloading or uploading, instant messaging, posting, emailing, chatting, presence, etc.) for the users of the application hosted by web servers 110. Edge servers 130 may maintain network or communication connections with user devices (e.g., clients 140) for messaging and other accesses. In addition, edge servers 130 may function as proxies for web servers 110. Clients 140 may communicate with web servers 110 through edge servers 130. In particular embodiments, servers 110, 120, and 130 and clients 140 may each have a unique identifier. For example, each server 110, 120, and 130 may be identified by its unique IP address, and each client 140 may be identified by its unique device identifier.

By using multiple servers, the workload of the social-networking website may be shared and balanced among the multiple servers and thus, the performance of the social-networking website may be improved. For example, the social-networking website may have hundreds of millions of users around the world, and at any given time, a great number of these users may be connected to the website through their respective user devices. New users may continually join the website as well. These users may be shared and balanced among multiple channel servers 120 to be serviced. In particular embodiments, a hash algorithm may be applied to the user identifier (e.g., the username or account number) of each user to determine to which channel server 120 a specific user is assigned. In addition or alternatively, channel servers 120 may be placed at different physical locations around the world, and a user may be assigned to a channel server 120 that is relatively close (e.g., in terms of physical distance) to the user's device. For example, a user located in Japan may be assigned to a channel server 120 located in Japan or China; while a user located in England may be assigned to a channel server 120 located in France.

In particular embodiments, each client 140 may be associated with a user as a user device. Each client 140 may be a mobile or non-mobile device and connected to a network wirelessly or through a wired connection. In particular embodiments, when a user connects with the social-networking website through his/her client 140 (i.e., the user device), client 140 may establish one or more connections with an edge server 130. Each connection may be a TCP/IP connection. More specifically, client 140 may be connected with an edge server 130 that is connected to the channel server 120 to which the user of client 140 is assigned.

Mobile Device

Figure 2:
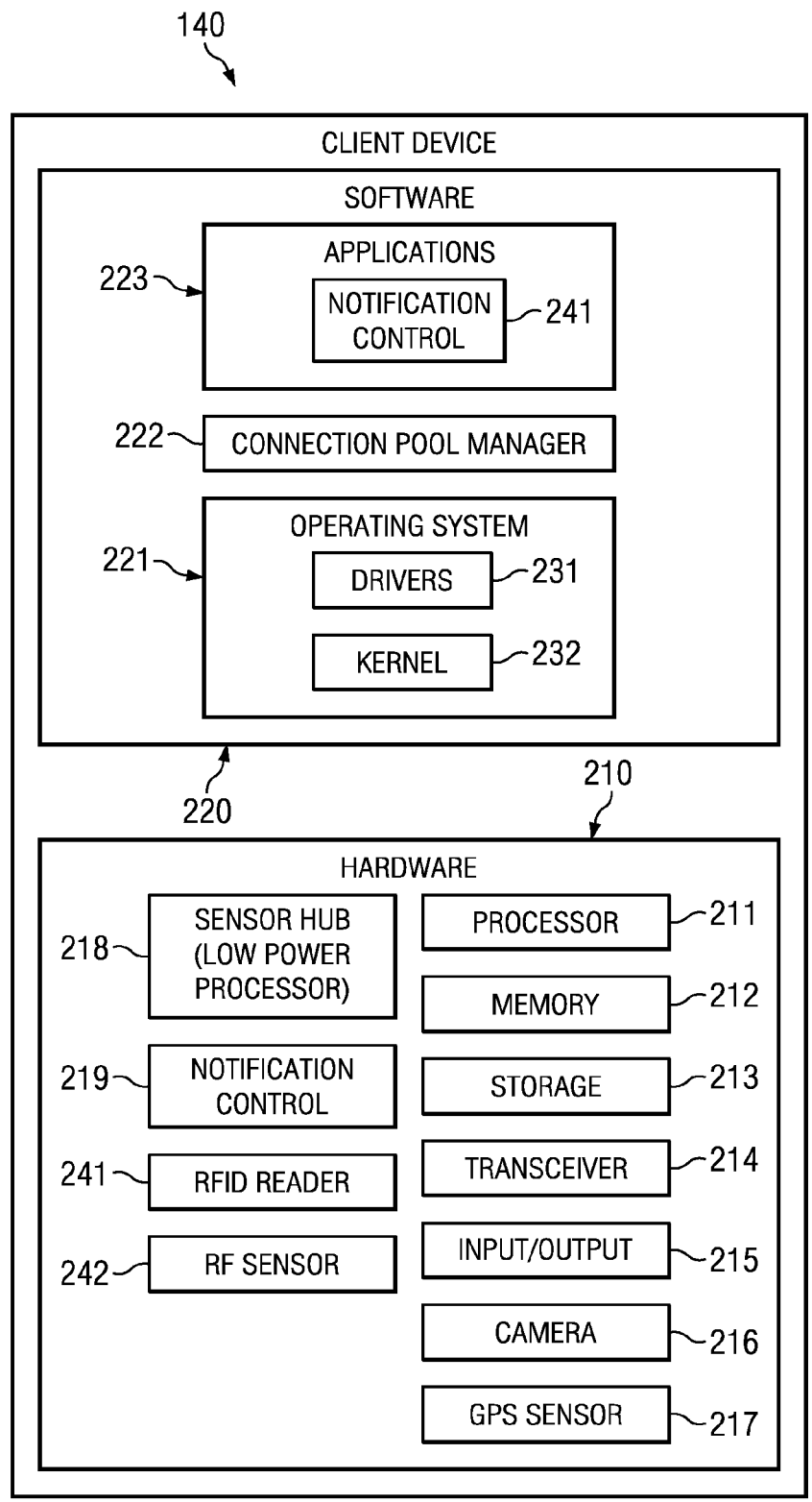
FIG. 2 illustrates an example user device.

FIG. 2 illustrates an example client device 140. In particular embodiments, a client 140 may include hardware, firmware, and software. In particular embodiments, client device 140 may be a smart phone (e.g., iPhone, Android-based phone, or Blackberry), which is a mobile telephone that offers more advanced computing ability and connectivity than a traditional mobile phone. It may be considered as a handheld computer integrated with a mobile phone. In particular embodiments, client device 140 may be a netbook or tablet computer (e.g., iPad, Android-based tablets). Client device 140 may be connected to a network through a wireless connection, such as a GSM or CDMA2000-based wireless cellular network.

In particular embodiments, client device 140 may include hardware 210 and software 220. In particular embodiments, hardware 210 may include any number of hardware components such as, for example and without limitation, processor 211, memory 212, storage 213, transceiver 214, input/output device 215 (e.g., display, touch screen, keypad, microphone, speaker, etc.), camera 216, global positioning system (GPS) sensor 217, sensors hub 218, notification control switch 219, RFID reader 241, RF sensor 242, and so on. This disclosure contemplates any suitable hardware components. In particular embodiments, some or all of a user's user data may be stored in storage 213.

In particular embodiments, software 220 may include an operating system 221, which may include a kernel 231 and/or any number of device drivers 232 corresponding to some of the hardware components available on client device 140. Operating system 221 may be selected for client device 140 based on the actual type of device client device 140 is. For example, if client device 140 is a mobile device (e.g., a smart phone), then operating system 221 may be a mobile operating system such as, for example and without limitation, Microsoft's Windows Mobile, Google's Android, Nokia's Symbian, Apple's iOS, and Samsung's Bada.

In particular embodiments, there may be a connection pool manager 222 residing and executing on client device 140, which may be implemented as computer software. In particular embodiments, one or more software applications 223 may be executed on client device 140. In particular embodiments, they may be native applications installed and residing on client device 140. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 216; a fifth application may allow the device user to receive and initiate VoIP and/or cellular network calls, and so on. In particular embodiments, there may be a software application (e.g., notification control 241) that enables the device user to manage the notifications pushed to client device 140. Each software application 220 may have a user interface and may implement one or more specific functionalities. Each software application 220 may include one or more software modules implementing the individual functionalities. The executable code of software applications 220, including notification control 241, may be stored in a computer-readable and non-transitory medium (e.g., storage 213 or memory 212) on client device 140.

Network Environment

Figure 3A:
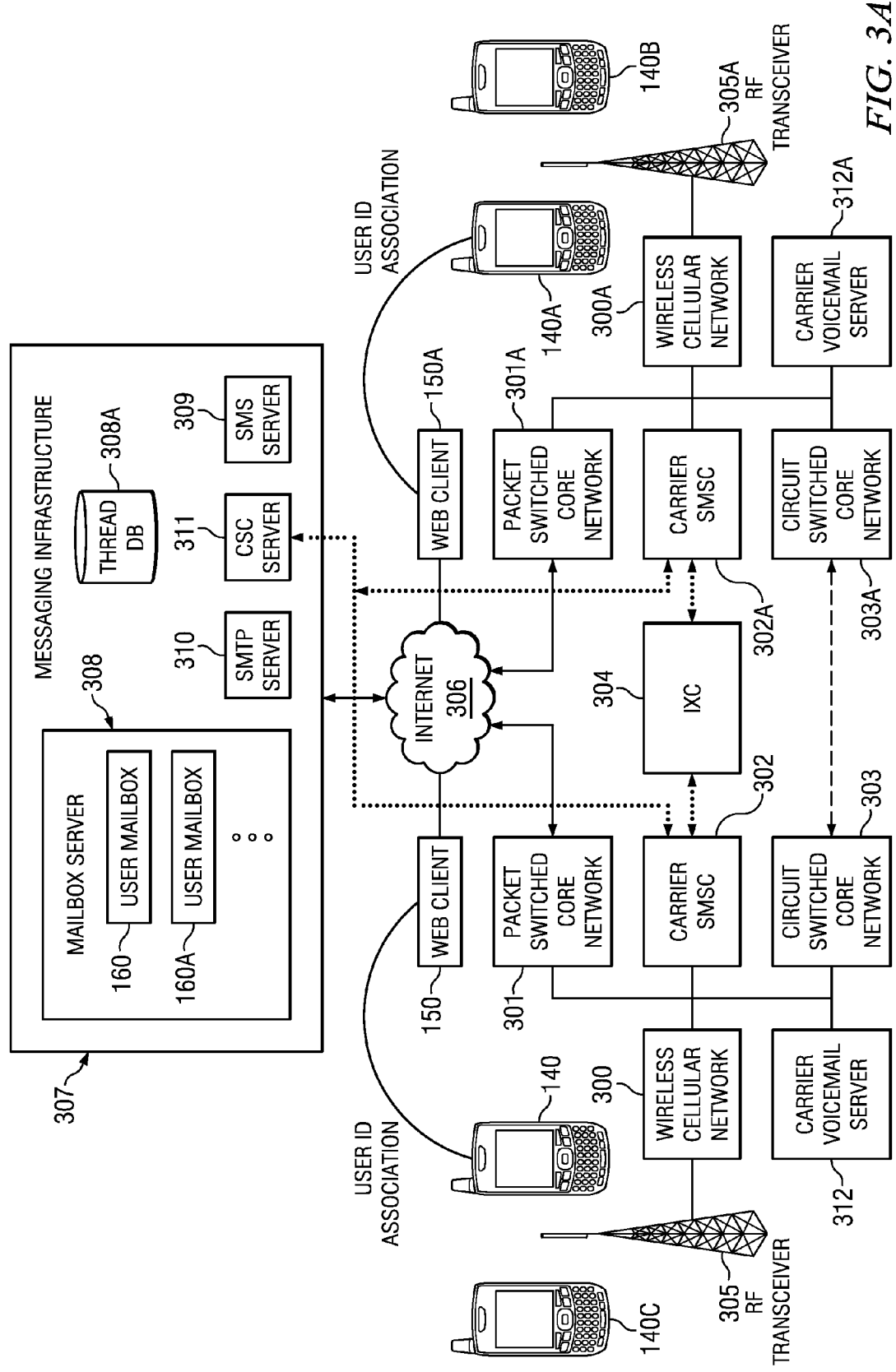
FIG. 3A illustrates an example network environment having multiple communication paths.

FIG. 3A illustrates an example network environment 300 having multiple communication paths. Network environment 300 includes one or more client devices 140, 140A, 140B, and 140C, wireless cellular networks 300 and 300A, and messaging infrastructure 307 for providing a unified messaging service to its users.

Client devices 140 and 140A, connect via wireless transmission media to a plurality of RF transceiver stations 305 and 305A operated by wireless cellular networks 300 and 300A. In particular embodiments, mobile devices 140 and 140A may obtain connectivity to Internet 306 through one or more wired or wireless networks not operated by wireless cellular network 300 and 300A operators. For example, mobile devices 140 and 140A may connect to Internet 306 through public or private 802.11 WiFi networks, 802.3 wired Ethernet LANs, 802.16 WiMax wireless networks, or Bluetooth personal area networks (not shown). For the purposes of this disclosure, mobile devices 140 and 140A do not distinguish between data connections through the aforementioned non-cellular data networks and wireless cellular networks 300 and 300A; so long as they have data connectivity, the data delivery channel is considered active and available.

In particular embodiments, mobile devices 140 and 140A may each be associated with a unique user identifier for a messaging service or social networking system. In particular embodiments, mobile devices 140 and 140A may associate with a particular user identifier the first time a user of mobile devices 140 and 140A log into the messaging service or social networking system. In particular embodiments, users with access to accounts on the messaging service or social networking system associated with the user identifiers may access the service/system through web clients 150 and 150A from any terminal having access to Internet 306. In particular embodiments, web clients 150 and 150A are not associated with any particular user identifier until the user provides login credentials; any number users of the messaging service or social networking system may access their respective accounts through a single web client 150 or 150A. In particular embodiments, In particular embodiments, mobile devices 140 and 140A may be installed with a messaging client application that overrides gen In particular embodiments, mobile devices 140 and 140A connect to a messaging service or social networking system via the notification channel as described above. In particular embodiments, a dedicated mobile application maintains the "always-on" data connection between social networking servers 307 or messaging infrastructure. In particular embodiments, the mobile application replaces conventional mobile device phone applications controlling dialing, email, SMS text messaging, picture messaging, instant messaging, voicemail, etc. into a unified messaging client. For the purposes of this disclosure, mobile devices having an associated user identifier with the social networking system or messaging service, as well as a unified messaging application replacing traditional mobile device messaging applications and maintaining an always-on notification/data channel to the social networking system or messaging service, such as mobile devices 140 and 140A, are herein referred to as "messaging client devices."

Mobile devices 140B and 140C represent mobile devices connected to wireless cellular networks 300 and 300A that either lack the messaging client described above; in other words, "plain" mobile devices, or devices having the messaging client but who have no data connectivity. Thus in certain scenarios, users of messaging client devices may send to or receive from mobile devices unassociated with any particular user identifiers on the social networking system or messaging service. In other scenarios, messaging client devices may only have connectivity through SMS and voice channels, as described in further detail below, and cannot connect through a data channel to the social networking system or messaging service.

As one of ordinary skill in the art may recognize, wireless cellular networks 300 and 300A may be provided by the same or different wireless carriers. Wireless cellular networks 300 and 300A may be of any suitable type, including without limitation, GSM-based cellular networks (including but not limited to EDGE, GPRS, UMTS, HSDPA/HSUPA, LTE, and the like) or CMDA-based cellular networks (including but not limited CDMA2000, EVDO, LTE, and the like). Wireless cellular networks 300 and 300A connect to the public IP network/Internet 306 through their packet-switched core networks 301 and 301A, and to the public-switched telephone network (PSTN) or IP-based voice branch exchanges through circuit-switched networks 303 and 303A. Each wireless cellular network 300 and 300A's carrier maintains one or more short message service centers (SMSCs) 302 and 303A for receiving, storing, and delivering SMS text messages and MMS messages. When transmitting an SMS message from one carrier network to another, such as from SMSC 302 to SMSC 302A, messages are commonly routed through inter-exchange carrier (IXC 304).

In particular embodiments, each subscriber to wireless cellular networks 300 and 300A may have an associate voice mailbox on carrier voicemail servers 312 and 312A. Typically, subscribers dial to a particular number, at which point they must authenticate with voicemail servers 312 and 312A to obtain access to their stored voicemails. In particular embodiments, voicemail servers 312 and 312A may authenticate via caller ID and a password. In particular embodiments, the user must enter both his or her cellular number and password. In particular embodiments, voicemail servers 312 and 312A may automatically authenticate using the subscriber's device media access control (MAC) address. In particular embodiments, voicemail servers 312 and 312A utilize push communications to transmit stored messages as audio files to subscriber devices. In particular embodiments, voicemail servers 312 and 312A utilize push communications to deliver new message notifications. In particular embodiments, the push notifications may be through the SMS channel. In particular embodiments, voicemail servers 312 and 312A perform speech-to-text processing, and deliver a transcription of stored voicemails in the form of emails, SMS text messages, or other text formats. This disclosure contemplates any suitable voicemail servers 312 and 312A.

Mobile devices 140, 140A, and users of web clients 150 and 150A connect to social networking system servers 307 through Internet 306. For the purposes of this disclosure, the unified messaging system is implemented by, and integrated with, a social networking system. However, one of ordinary skill in the art can envision a unified messaging system that is untied from a social networking system. In particular embodiments, the unified messaging system may integrate with other third-party sites, such as crowd-sourced review sites, shopping sites, and the like. In particular embodiments, the unified messaging system may integrate with a plurality of social networking system, email services, voice-over-IP (VoIP), video chat, push to talk (PTT), or other communication services. This disclosure contemplates a unified messaging system that may integrate with any suitable communications service or protocol. For the purposes of this disclosure, the term "messaging infrastructure" and "social networking system" are interchangeable.

Messaging infrastructure 307 may include one or more messaging servers 308-311 collectively providing a unified messaging infrastructure. Mailbox server 308 facilitates delivery, organization, and storage of messages relayed through social networking servers 307. Mailbox server 308 maintains a user mailbox 160, 160A, etc. for each user of the social networking system. In particular embodiments, users may view their mailbox from messaging client applications on mobile devices 140 and 140A, or by logging in to a social networking website via web clients 150 or 150A.

Mailbox server 308 is also responsible for organizing all messages into individual conversation threads. For example, if user A and user B communicate over the course of their relationship via a plurality of communication methods, such as email, phone, text, etc., mailbox server aggregates all the messages exchanged between user A and user B into a single thread. Thus both users A and B may quickly access all their interactions with each other from their mobile device or through a web interface without concerning themselves as to what service was used to deliver or send the message. Similarly, users do not need to concern themselves with deciding how to best reach a particular user. These features are described in further detail below.

Mailbox server 308 may, in particular embodiments, store conversation threads in a thread database 308A. Thread database 308A may be a separate server from, or in particular embodiments, a part of mailbox server 308. In particular embodiments, thread database 308A may comprise multiple distributed servers to cope with the requirements of storing a large number of messages for potentially hundreds of millions of users. In particular embodiments, conversation threads are organized by the participants in the conversation. In the example above, a conversation between users A and B would constitute a unique thread having a unique thread identifier (thread ID). As another example, a conversation between users A, B, and C could, in particular embodiments, constitute another unique thread (and similarly having its own unique thread ID). In particular embodiments, the conversation participants are identified by their unique social networking user identifier. In particular embodiments, the conversation participants are identified by their phone number. Particular exemplary methods of sorting messages and associating them with conversation threads is discussed further with reference to FIG. 5A.

Mailbox server 308 may, in particular embodiments, access a policy database 308B containing a set of policies for each user defining how each user wishes to send or receive messages. For example, certain users may wish to only receive messages via email to avoid messaging charges. As another example, certain users may wish to reduce data plan charges and transmit messages only via SMS. In particular embodiments, users may fine tune their message delivery policies based on any definable factor. For example, a user may enter his or her messaging plan details, for example, that he or she receives 300 free SMS text messages per billing cycle, and specify that all messages after 300 are to be transmitted or received via SMS. As one of ordinary skill in the art can envision, these policies may be applicable to any conceivable communications service or protocol; for example, a user may specify that all calls be delivered over a VoIP client when data service is available, and only through circuit-switched network 303 when a data connection is unavailable. In particular embodiments, the social networking system may implement selectable policy modes, such as "best effort" (delivering the message through any available communications channel), "guaranteed delivery" (delivering the message only through SMS or data protocols that acknowledge reception or reading, such as BBM or Kik messenger), "low bandwidth" (delivering the message as cheaply as possible), and the like. In particular embodiments, the policy may be based off the explicit or inferred urgency of a message. For further discussion of an urgency indicator for messages, please see commonly owned U.S. patent application Ser. Nos. 13/277,096 and 13/277,121, respectively entitled "Urgency Notification Delivery Channel" and "Inferential Urgency Notification Delivery Channel", both filed on 19 Oct. 2011, and herein incorporated by reference. This disclosure contemplates any suitable method of defining message transmission/reception policies based on any number of factors.

In particular embodiments, messaging infrastructure 307 includes a simple-mail transfer protocol (SMTP) server 310. SMTP server transmits email to external email accounts. In particular embodiments, SMTP server 310 may transmit all emails from a default email address on behalf of a particular user, such as usernam@facebook.com. In particular embodiments, SMTP server 310 may perform email sender spoofing to generate an email message that appears to have originated from a different email account; for example, an employee may wish for all messages to appear to have gone through his employer's domain. In particular embodiments, the user may configure one or more policies in policy db 308B that dictates what address SMTP server 310 spoofs. Methods of email address spoofing are well known in the art and will not be discussed further here.

In particular embodiments, messaging infrastructure 307 includes a common short-code (CSC) server 311. CSC server 311 receives SMS messages from messaging client devices addressed to a special short code, such as "32665." In particular embodiments, CSC Server 311 also transmits SMS messages to messaging client devices 140, 140A, as well as non-messaging client devices 140B, and 140C. Short codes (also known as short numbers) are special telephone numbers, significantly shorter than full telephone numbers, that can be used to address SMS and MMS messages from certain service provider's mobile phones or fixed phones. Short codes are designed to be easier to read and remember than normal telephone numbers.

In particular embodiments, messaging infrastructure 307 includes an SMS server 309 for transmitting SMS messages directly to carrier SMSCs. In particular embodiments, the social networking system may establish special relationships with carriers of wireless networks 300 and 300A to configure "special binds" between SMS server 309 and carrier SMSCs 302 and 302A. These special binds permit the messaging infrastructure to transmit an SMS message to a non-messaging client mobile device while spoofing the phone number of the sender. For example, if messaging client user A transmits an SMS message to a mobile phone number on wireless cellular network 300A using the CSC server, user B receives an SMS from, for example, "32665" instead of the mobile number of user A. (This concern is not an issue when user B utilizes the unified messaging client, which will replace the sender number with the appropriate user name.) However, when transmitting a message using a special carrier bind, the recipient mobile phone receives an SMS with the phone number of User A's device in the "from" field, even though the SMS actually originated from SMS server 309. In particular embodiments, SMS server 309 connects to carrier SMSCs via a short message peer-to-peer (SMPP) message over Internet 306. In particular embodiments, SMS server 309 may be part of CSC server 311. In particular embodiments, SMS server 309 and CSC server 311 may share a common IXC 304. This disclosure contemplates any suitable arrangement of servers for the delivery of SMS messages to carrier SMSCs 302 and 302A.

Social networking system/messaging infrastructure 307 may include web servers 110, channel servers 120, and edge servers 130, as previously described with reference to FIG. 1. Client devices 140 and 140A may be connected to the same or different ones of web, channel, and edge servers 110, 120, and 130, respectively.

As previously discussed, messaging infrastructure 307 maintains a notification channel (depicted as the solid line in FIG. 3A) with both mobile device 140 and 140A. As previously discussed, the notification channel may be a persistent TCP/IP connection, VPN tunnel, or any other suitable persistent data connection. The notifications channel between servers 307 and mobile devices 140 maintains a connection through Internet 306 and the packet-switched (data) core network 301 of mobile device 140's wireless cellular network 300. From wireless cellular network 300, the data is transmitted to RF transceiver 304 (the cell tower, base station, Node B, and the like) that is servicing mobile device 140. Similarly the notification channel between social networking servers 306 and mobile device 140A maintains a connection through Internet 305 and packet-switched (data) core network 301A in mobile device 140A's wireless cellular network 300A. Wireless cellular networks 300 and 300A may be disparate wireless cellular networks, or where mobile devices 140 and 140A are serviced by the same carrier, a single wireless cellular network.

As previously discussed, the notification channel may be a persistent TCP/IP connection, and mobile devices 140 and 140A may periodically send keepalive messages to social networking system/messaging infrastructure 307. In particular embodiments, mobile devices 140 and 140A adjust the keepalive interval based upon an adaptive algorithm. In particular embodiments, keepalive messages are transmitted at a pre-set interval. In particular embodiments, keepalive messages may be transmitted from the server to the handsets. In particular embodiments, the notification channel utilizes the packet-switched data network for upstream data, such as HTTP requests or uploads from mobile devices 140 and 140A, and SMS channels 302 and 302A for pushing notifications to mobile devices 140 and 140A. This disclosure contemplates any suitable method of establishing and maintaining a persistent data connection between social networking system 307 and mobile devices 140 and 140A.

Figure 3B:
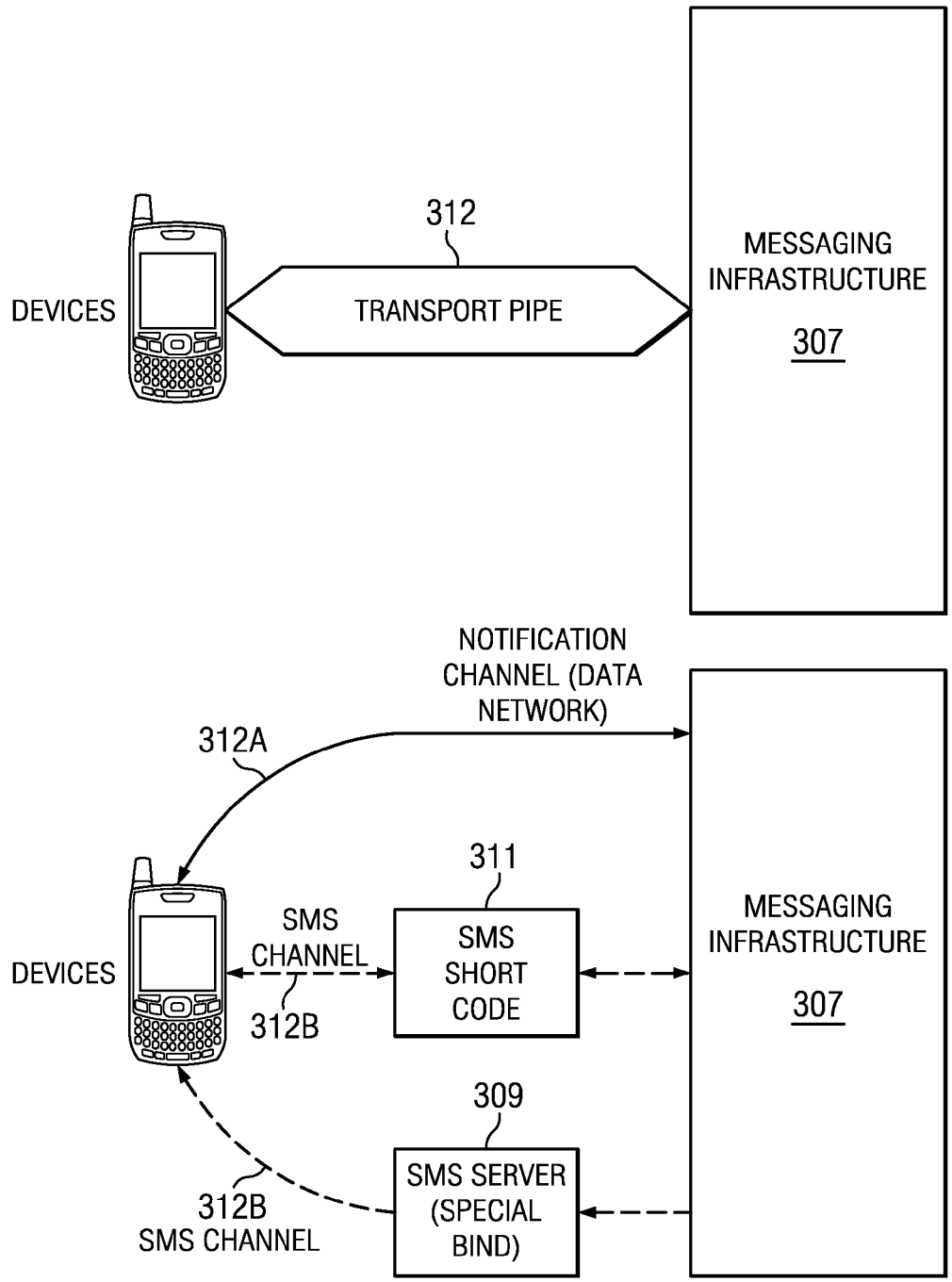
FIG. 3B depicts a simplified representation of the transport channel between messaging infrastructure servers and one or more client devices.

FIG. 3B is a simplified representation of the transport channel 312 between messaging infrastructure servers 307 and one or more client devices 140. The users of messaging client mobile devices 140 and 140A are agnostic and unaware of the means by which their messages and communications are relayed to other users via messaging infrastructure 307. Thus, at a high level of abstraction, messaging client mobile devices 140 and 140A maintain a connection to messaging infrastructure 307 via transport pipe 312, where the transport pipe may be any number of different protocols or data networks. For example, in FIG. 3B, transport pipe 312 comprises notification channel 312A and SMS channel 312B. As previously stated, notification channel 312A may be through any packet data network, whether cellular or WiFi/WiMax. Similarly, SMS channel 312b may utilize SMS short code server 311 or SMS server 309, or any combination of the two. Thus, messaging server 307 determines, based on connectivity and policies stored in policy db 308B, which of the paths 312A or 312B within transport pipe 312 should be used to transmit or receive a given message for a mobile device 140 or 140A. (Clearly, for non-messaging client devices 140B-C, the only transport path available is SMS channel 312B).

Because of the size constraints of SMS, in particular embodiments, when transmitting messages via SMS channel 312B, both messaging client mobile devices 140, 140A as well as messaging infrastructure 307 performs SMS concatenation. In particular embodiments, concatenated SMS messages are transmitted in accordance with 3GPP TS 23.040. In particular embodiments, concatenated SMS messages are transmitted with a user data header (UDH) that includes the number of total messages in the sequence and the particular message's number in the sequence. Methods of transmitting messages longer than 160 characters as multiple concatenated SMS messages are well-known in the art, and will not be discussed in detail here.

Conversation Thread User Interface

FIG. 4A illustrates an example interface implementing a conversations view on a messaging client mobile device 140 or 140A in accordance with an embodiment. For didactic purposes, FIG. 2 illustrates the interface of a dedicated application, such as on a touchscreen-operated mobile phone. In particular embodiments, the interface includes an option for selecting the conversations view 401, an option for browsing a list of contacts 402, and option to browse contacts marked as favorites 403, and an option to launch the keypad 404. In particular embodiments, the interface also includes a search bar 405, which allows the user to search both contact names and the content of conversations.

Upon selecting the conversations button 401, the application opens a list of conversations 420-435, arranged in this example, temporally with the most recently active conversation first. The conversations are separated into two tabs, "friends" 455 and "others" 460. Friends tab 455 displays conversations with contacts that are also members of social networking system. Others tab 460 displays conversations with participants who are not members of social networking system. For example, the may have a contact stored as "Mom" in their client device 140 that does not correspond to a user on the social network. The conversation between the user and his or her mom will be displayed in "others" tab 460. As another example, the user may receive a call from a telemarketer dialing from 650-555-5555, who is neither a member of the social network nor a stored contact. However, because call log data is generated for this incoming call, the conversation between the and 650-555-5555 will be displayed in "others" tab 460.

The first conversation 420 represents a conversation between six users (all members of the social network)—Joel Seligstein, Dan Hield, Joe Lei, and 2 others. Conversations 425, 430, and 435 represent conversations with individual contacts, in these examples, Grace O'Malley, Alex Chang, and James White.

For each conversation, a brief summary of the conversation is presented in the interface. In one embodiment, the summary includes the names 440 of the conversation participants, pictures 445 of the conversation participants, and an excerpt 450 from the most recent message in the conversation. In one embodiment, conversations including multiple participants do not have pictures 445 to save space. The summaries are organized by time/date so that conversations with the most recent messages are placed higher in the interface. The name and/or picture of the user that the mailbox belongs to (the "mailbox owner") is not displayed in the summary because it is understood that the mailbox only includes conversations in which the mailbox owner is a participant.

When a conversation has a large number of participants, in one embodiment only a sub-set of the names are presented to simplify the summary. The sub-set can be any number of participants from the conversation. For example, conversation 420 has six participants. In one embodiment, only the names of a sub-set of conversation participants are displayed. The name of the mailbox owner is not shown in the summary. The names of the other participants are grouped together and presented as "2 others."

In one embodiment, the brief excerpt 450 may be extracted from the content of the most recent message in the conversation. For example, in conversation 420, the excerpt 440 includes the text "But do you always have to match your shoes . . . " which is the most recent message from this conversation 420. In other embodiments, the brief excerpt is extracted from other information that is not message content, such as metadata associated with the message. For example, the brief excerpt could be the title of the most recent e-mail message in the conversation.

In one embodiment, the mailbox server 308 aggregates messages of different formats (e-mail, SMS text, instant message) and communication protocols (voice, VoIP, video, etc.) into conversations. Each conversation thus becomes a historical record of all correspondence between a set of users regardless of the format of the messages or log data. For example, if Adam sends an online instant message to Bob and also separately sends an e-mail to Bob, both of these messages are placed into the same conversation. Similarly, if Bob leaves Adam a voicemail, an indicator of the voicemail (such as the date and time it was left), or, alternatively, transcribed text from the voicemail, will be placed into the conversation. As another example, if Adam calls Bob, the log of the call will be placed in the conversation as well. Thus the conversations window groups all communications, irrespective of format or protocol, in a single history for each of the user's real-world contacts.

FIG. 4B illustrates a conversation that aggregates different message formats according to an embodiment. The user can reach this display by selecting one of the conversations in the interface of FIG. 4. In particular embodiments, the interface includes buttons to message 480, and call 485 the contact.

Shown is a one on one conversation between the user and James White that comprises of a series of messages 470. Although messages may have been delivered via different accounts and with different communications services, such as email, IM, text, etc., each message is merely displayed as a message without further indication of how the message was delivered. Icon 465 indicates a message was marked by James as "urgent." Icon 475 indicates that there was an incoming phone call from James White, and the entry associated with icon 475 indicates that the call was received yesterday at 11:00 AM and lasted 4 minutes, 53 seconds. The conversation can be updated live as new messages are received that update the conversation. As discussed above, a conversation is akin to a historical record of all correspondence between a set of users. Through the interface, a mailbox owner can scroll backwards in time to view the entire history of the messages in the conversation. In one embodiment, some of the messages can have attachments such as pictures, videos, documents, etc. The pictures and video can be shown in the interface with a preview of the attachment instead of just a link to the attachment. For example, an attached picture can be shown in the interface with a thumbnail of the picture. For the mailbox owner, the conversation appears to include both outgoing and incoming messages and log data.

Conversation Thread Creation

Figure 5A:
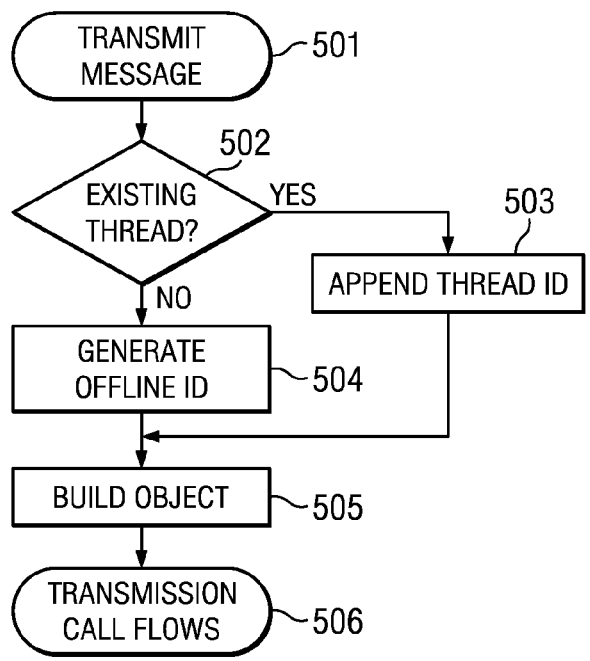
FIG. 5A illustrates an example method executed on a client device prior to transmitting a message.

FIG. 5A illustrates an example method executed on a client device prior to transmitting a message. While mailbox server 308 is responsible for the organization and storage of messages in threads, messaging client application residing on mobile devices 140 and 140A may store a local copy of all or a portion of its associated conversation threads stored in mailboxes 160 and 160A, respectively. In particular embodiments, messaging client only stores messages from a predetermined duration, such as the last month. In particular embodiments, messaging client device only stores messages until a given amount of storage is consumed for the thread. In particular embodiments, messaging client device begins downloading more messages when a thread is opened, such as in FIG. 4A. This disclosure contemplates any suitable method of locally storing conversation threads.

At Step 501, the user of mobile device 140 initiates a message to a recipient. The user may initiate this communication in a variety of ways. For example, referring to FIG. 4, the user may select an existing thread 420-435 from his or her threads with friends, and, upon being taken to the thread view of FIG. 4B, select the "message" button 480 or the "call" button 485). The user may perform this same process for threads in the "others" tab 460. The user may also select the "new message" option and enter a phone number or select a contact from his or her locally or remotely stored list of contacts. The user may also actuate keypad 404 and enter a phone number to initiate a voice communication. Regardless of the method the user initiates a communication at Step 501, the client device proceeds to step 502.

At Step 502, the client device checks whether the communication belongs in an existing thread. For example, if a user selects a thread and replies to a message in the thread, mobile device 140 is aware that the message belongs in the existing thread. As another example, if the user manually selects one or more contacts or enters one or more recipient numbers, client device 140 may perform a lookup of locally stored threads for the same recipients. As an example, referring to FIG. 4A, if the user selects "new message" and enters the number for Alex Chang, mobile device 140 may search for locally stored conversation threads having only the user and Alex Chang as participants. In particular embodiments, as wireless data speeds increase and latency decreases, client device 140 may search existing threads by querying mailbox server 308. This disclosure contemplates any suitable method of determining whether an outgoing communication belongs in a thread.

At Step 503, if client device 140 finds a thread matching the participants of the outgoing communication, client device 140 pulls the thread ID from the thread and appends it to the communication, whether the communication is a message or a call log entry. If client device is unable to find a thread having the same participants as the outgoing communication, at Step 504 client device 140 generates a unique offline identifier, or offline ID, for the message.

In particular embodiments, the offline ID is an identifier that is unique to each message. In particular embodiments, client device 140 generates a UUID for each message it transmits or receives regardless of whether it is part of an existing thread. In particular embodiments, client device 140 only generates a UUID for messages that are not part of an existing thread. Given that there are potentially hundreds of millions of users each transmitting thousands of messages, an offline ID of sufficient size must be generated to maintain uniqueness. In particular embodiments, the offline ID is 128 bits long. In particular embodiments, the offline ID is generated by a random number algorithm. In particular embodiments, the offline ID is generated based on the client device ID, time, GPS location, or other factors. Methods for generating universally unique identifiers (UUIDs) are well-known in the art, and are not further described herein. This disclosure contemplates any suitable method of generating a unique offline ID for a message.

At Step 505, client device 140 builds a message object to transmit to messaging infrastructure 307. In particular embodiments, the message object is a JavaScript Object Notation object. In particular embodiments, the message object includes the message body (or call log data, if the communication is a call), the identifiers for the recipients (if the message is a new thread), the thread ID (if the message is part of an existing thread), and the offline ID of the message (if it exists).

Therefore, in particular embodiments, message objects for messages belonging to existing threads contain only the body and thread ID in order to reduce message object size and therefore device bandwidth. In particular embodiments, messages that do not belong to an existing locally-stored thread are transmitted in a message object containing the message body, identifiers for the recipients, and the message offline ID.

At Step 506, client device 140 transmits the message to the recipient (for didactic purposes, mobile devices 140A and 140B of FIG. 3A), or to messaging infrastructure 307 based on policies in policy DB 308B. The individual call flows for the various transmission scenarios are described in further detail with reference to FIGS. 6-16.

Messaging infrastructure 307 periodically synchronizes mailbox 160 with locally stored threads on mobile device 140. In particular embodiments, the synchronization occurs every time a transmission is sent by or received from mobile device 140. In particular embodiments, mobile device 140 synchronizes with messaging server 160 at predetermined intervals, such as every thirty minutes. In particular embodiments, mobile device 140 synchronizes every time the user accesses the social networking system. This disclosure contemplates any suitable method or interval for synchronizing conversations threads stored locally on mobile device 140 and conversation threads stored remotely in mailbox 160.

Techniques for synchronizing mailboxes are well-known in the art. In particular embodiments, mailbox server 307 compares all conversation threads in user mailbox 160 with the locally-stored conversation threads on messaging client device 140, and subsequently pushes down new messages or pulls up new messages and places them into threads. In particular embodiments, messages residing on client device that merely have an offline ID, that is, not belonging to an existing thread, are pulled from mobile device 140 to mailbox server 308, where the mailbox server creates a new thread for the message, as further described below. This disclosure contemplates any suitable method of synchronizing mailbox 160 and a locally-stored copy of conversation threads on mobile device 140.

Figure 5B:
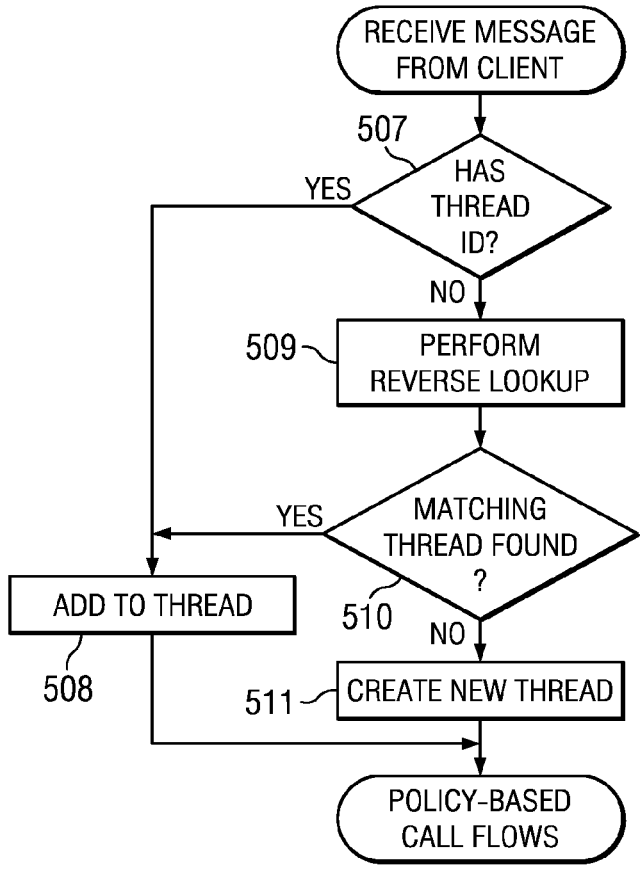
FIG. 5B illustrates an example method executed server-side for the assignment of messages to conversation threads.

The process of FIG. 5B is also performed by a messaging client device (for example, device 140A in FIG. 3A), when receiving a message directly via an SMS channel. For example, a non-messaging client device such as device 140C may transmit an SMS directly from its carrier SMSC 302, via the IXC 304, to the recipient's carrier SMSC 302A, to device 140A. In such a case, recipient mobile device 140A must generate an offline ID for the message (as it will not have a thread ID) and transmit the message to the server for synchronization and subsequent storage in mailbox 160A.

FIG. 5B illustrates an example method executed server-side for the assignment of messages to conversation threads. To begin the process, mailbox server 308 receives a message from a client device. Mailbox server 308 may receive messages from messaging client devices 140 and 140A through the data channel 312A, or, if no data connection is available, through the SMS channel 312B, either via SMS server 309 or SMS short code 311. Mailbox server 308 may receive devices directly from web clients 150 and 150A, and from non-messaging client devices 140B and 140C through short code (CSC) server 311. In particular embodiments, where a special bind exists between the transmitting device's carrier 302 and SMS server 309, a non-messaging client recipient (for example device 140B) may reply to an SMS from SMS server 309 wherein the "from" field of the message is spoofed to match the phone number of the transmitting device. In such embodiments, the reply message may be delivered directly to the transmitting handset. In particular embodiments, the reply message may be delivered to SMS server 309, and subsequently, mailbox server 308.

Upon reception of a message to be transmitted to a messaging client device (for example device 140A in FIG. 3A) or on behalf of a messaging client device (for example, device 140) at Step 507, mailbox server 308 checks if the message includes a thread ID. If the message includes a thread ID, at Step 508 mailbox server 308 simply appends the message to the end of the thread, stored in thread database 308B, identified by the thread ID. If the message does not contain a thread ID, mailbox server 308 at Step 509 performs a reverse-lookup in order to determine if the message belongs in an existing thread. In particular embodiments, messaging infrastructure 307 performs a reverse-lookup by querying a database of user profiles with a phone number, and receiving a social networking user identifier in response. In particular embodiments, messaging infrastructure 307 performs a reverse lookup by calling a social networking application programming interface. This disclosure contemplates any suitable method of performing a reverse lookup.

Different data may be transmitted in a message or message object lacking a thread ID depending on the transmitting client device. For example, a messaging client device 140 with a data connection may transmit explicit social networking user identifiers for the participants in a message thread (the recipients of the message). However, in particular scenarios, a user may not have explicitly linked a phone number or phone contact with a social networking user ID. For example, a particular user may have a contact in his or her mobile device named "Mom" but not linked to the individual's actual social networking account. In such a scenario, messaging client device 140 or 140A may transmit a message object merely containing the phone number (for didactic purposes, assume the phone number for "Mom" is 555-213-6689 and is represented by a user named "Jane Smith" on the social networking system) for thread participant. In particular embodiments, users of the social networking system may have published or unpublished phone numbers based on their privacy settings. For example Jane Smith may have listed the number 555-213-6689 on her social networking profile. In such a scenario, mailbox server 308, upon receiving a message including a participant identifier of "555-213-6689", calls the social networking API to perform a reverse lookup for users associated with the number "555-213-6689." In this case, the social networking API may return the user identifier for "Jane Smith," and the message may be stored in a thread containing the sender and "Jane Smith."

In particular embodiments, whether the social networking API returns user IDs associated with a particular phone number after a reverse-lookup operation depends on the privacy settings of the recipient. For example, a particular user may wish to separate his or her business phone number from his social networking account; avoiding a situation where a business contact is suddenly and unintentionally aware of his identity on the social networking system. Thus, the social networking API may consult a privacy database in order to determine whether a number is "published" or "private." For the purposes of this disclosure, "published" means that the number is visible to the sender on the recipient's social networking profile. For example, Jane Smith may have privacy settings that allow her immediate family to see the number 555-213-6689 on her profile. In such a scenario, if her son transmits a message object having the number to mailbox server 308, the reverse lookup will return Jane Smith's social networking user identifier, even though her son has not explicitly linked "Mom" to "Jane Smith" in his mobile device. Extending this example, a user of a messaging client device 140 may have exchanged messages or calls with Jane Smith without knowing her identity, for example, in connection with goods or services offered on sales sites such as www.craigslist.org. Upon synchronizing the user's messaging client device 140 with the mailbox server, the user will only see the phone number without Jane Smith's associated user ID in order to protect privacy settings.

In particular embodiments, a first user may have explicitly linked a phone number to a second user on the first user's mobile device 140, even though the second user has not made the number public to the first user. In the above example, assume Jane Smith has not published the number 555-213-6689 on her user profile, but her son has made an explicit connection on his mobile device between the number and Jane Smith on the social networking system. In such a scenario, mailbox server 308 will only use Jane Smith's social networking user identifier for communications with the user who made the explicit linkage, in this case, her son. For example, if the son transmits a group message to user B and Jane Smith, the son's mailbox will contain a conversation thread between himself and Jane Smith, but user B's mailbox will only reflect a conversation thread between user B and 555-213-6689.

After resolving performing a reverse lookup and resolving the one or more participant's phone numbers with users of the social network at Step 509, mailbox server 308 searches for threads containing the same set of participants in thread database 308B. If a matching thread is found, at Step 510 the mailbox server appends the new message to the matching thread.

If no matching thread is found, at Step 511 mailbox server 308 creates a new thread ID for the message, and includes a copy of the message in each of the participants' mailboxes. Then, based on the type of message and the policies dictating delivery to individual recipients, mailbox server 308 applies policy-based delivery to the message and, for outgoing messages, transmits the message to the intended recipient. For an incoming message, i.e., received by a messaging client device and transmitted up to messaging infrastructure 307, mailbox server 308 merely updates the recipient mailbox.

Message Delivery

The following call flow diagrams illustrate example methods of delivering a message via messaging infrastructure 307. As a general principle, the unified messaging system routes all messages through messaging infrastructure 307, if possible, and if not, transmits a copy of the message for storage in users' mailboxes. As another general principle, the unified messaging system transmits as little information as possible through the user of thread IDs. Individual use cases are described in detail below.

Figure 6:
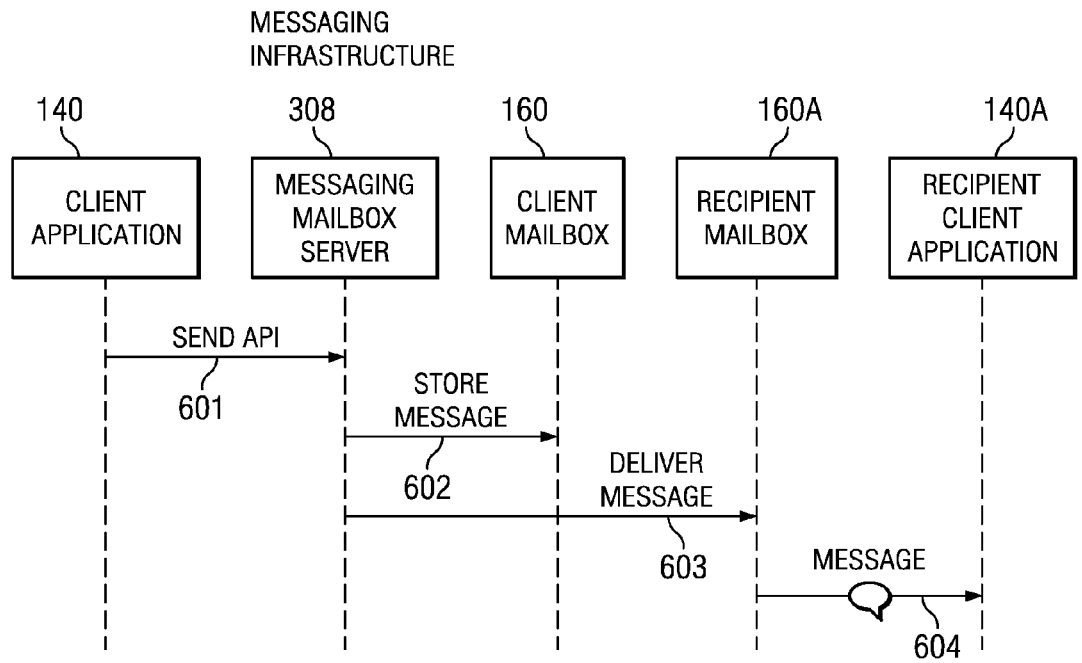
FIG. 6 illustrates an example call flow for transmitting an outgoing message from a messaging client device to a messaging client recipient's web mailbox.

FIG. 6 illustrates an example call flow for transmitting an outgoing message from a messaging client device 140 to a messaging client device 140A as well as associated web mailboxes 160 and 160A. In particular embodiments, at Step 601, the messaging client application on mobile device 140 requests mailbox server 308 to transmit a message by making a representational state transfer (REST) API call over a transport layer security (TLS) connection. In particular embodiments, the connection is a secure socket layer (SSL) connection.

At Step 602, mailbox server 308 stores the message in the transmitting user's mailbox 160, and at Step 603, mailbox server 308 stores the message in the recipient's mailbox 160A. At Step 604, messaging server 308 transmits the message over data channel 312A to the messaging client residing on mobile device 140A. The receiving user may view the incoming message via the messaging client on his or her mobile device 140A.

Figure 7:
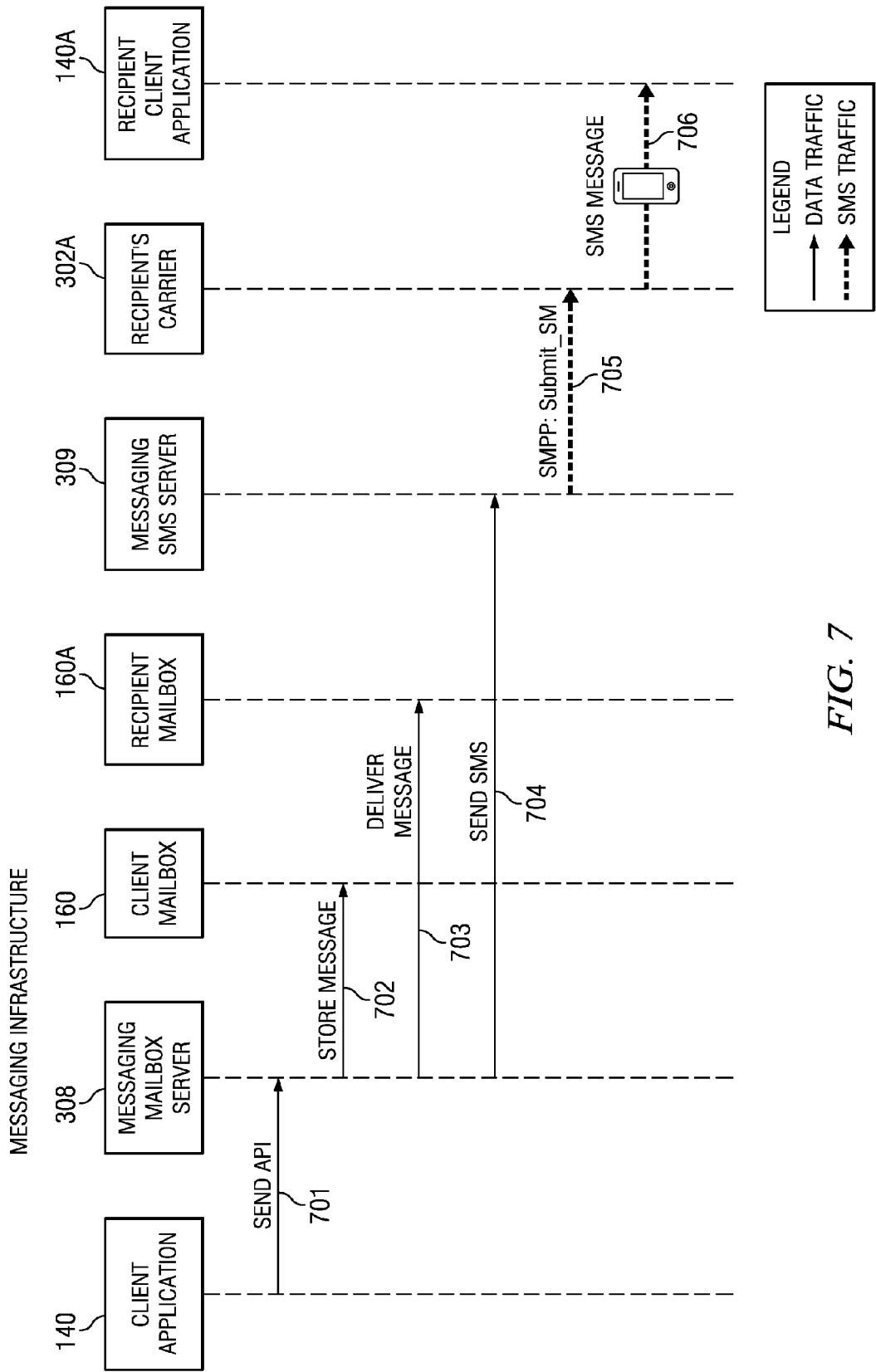
FIG. 7 illustrates an example call flow for transmitting an outgoing message from a messaging client device to a messaging client recipient's web mailbox and client device via SMS.

FIG. 7 illustrates an example call flow for transmitting an outgoing message from a messaging client device 140 to a messaging client recipient's web mailbox 160A and client device 140 via SMS channel 312B. At Step 701, the messaging client application on mobile device 140 requests mailbox server 308 to transmit a message by making REST API call over a TLS connection. At Step 702, mailbox server 308 stores the message in the transmitting user's mailbox 160, and at Step 703, mailbox server 308 delivers the message by storing the message in the recipient's mailbox 160A.

At Step 704, determines that it should utilize SMS channel 312B to deliver the message to recipient mobile device 140A if, for example, recipient mobile device 140A lacks a data connection and is therefore offline. Mailbox server 308 transmits the message to SMS server 309, or, alternatively, CSC server 311 instructing it to transmit the message to the mobile device.

At Step 705, SMS server 09 or CSC server 311 routes the message over an SMPP bind to the recipient carrier SMSC 302A, who then delivers the message as an SMS to recipient mobile device 140A. Where CSC server 311 is utilized, the recipient receives the message as an SMS from the social networking system shortcode. Where a special bind exists between the social networking SMS server and the carrier SMSC 302A, the recipient receives a spoofed SMS having the phone number of mobile device 140 in the "from" field.

Figure 8A:
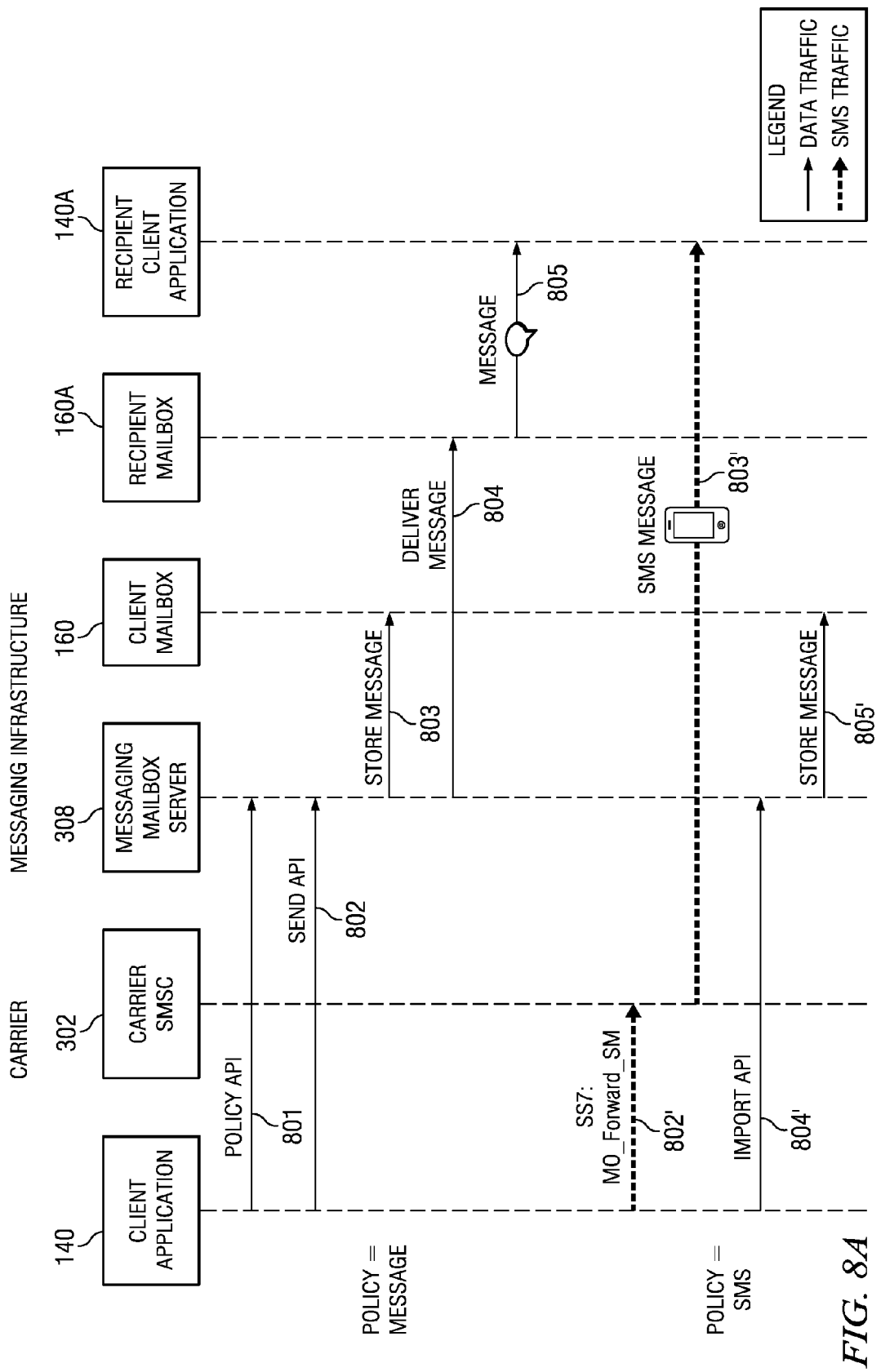
FIG. 8A illustrates an example call flow for transmitting an outgoing message from a messaging client device to a messaging client recipient's web mailbox or client device based on one or more policies.

FIG. 8A illustrates an example call flow for transmitting an outgoing message from a messaging client device 140A to a messaging client recipient's web mailbox 160A or client device 140A based on one or more policies. At Step 801, the messaging client on mobile device 140 queries mailbox server 308 over data channel 312A to obtain a message routing policy by making a REST API call over a TLS connection. In response, mailbox server 308 looks up the routing policies for both the transmitting device as well as the recipient device, and determines whether the outgoing message should be sent over data channel 312A or SMS channel 312B.

If policy dictates that the message be transmitted over data channel 312A, at Step 802 the messaging client on mobile device 140 transmits the message to mailbox server 308 and requests mailbox server 308 (via a REST API call over TLS, in particular embodiments) to transmit the message. At Step 803, mailbox server 308 stores the message in the transmitting user's mailbox 160, and at Step 804, mailbox server 308 delivers the message by storing the message in the recipient's mailbox 160A. At Step 805, mailbox server 308 delivers the message to the messaging client residing on mobile device 140A over data channel 312A.

If policy dictates that the message be transmitted over SMS channel 312B, at Step 802' the messaging client on mobile device 140 requests its mobile carrier SMSC 302 to transmit the message. In particular embodiments, this request is transmitted over the SS7 protocol. At Step 803', recipient mobile device 140A receives an SMS message from transmitting mobile device 140's mobile phone number via its cellular carrier. At Step 804', the messaging client on mobile device 140 requests mailbox server 308 to save the message. In particular embodiments, this request is a REST API call, and in Step 805 mailbox server 308 stores the message in the transmitting user's mailbox 160. In particular embodiments, the new message received by mobile device 140A is pulled and stored in the recipient user's mailbox 160A on mailbox server 308 upon the next synchronization operation. In particular embodiments, the message is stored in mailbox 160A upon delivery at Step 805'.

Figure 8B:
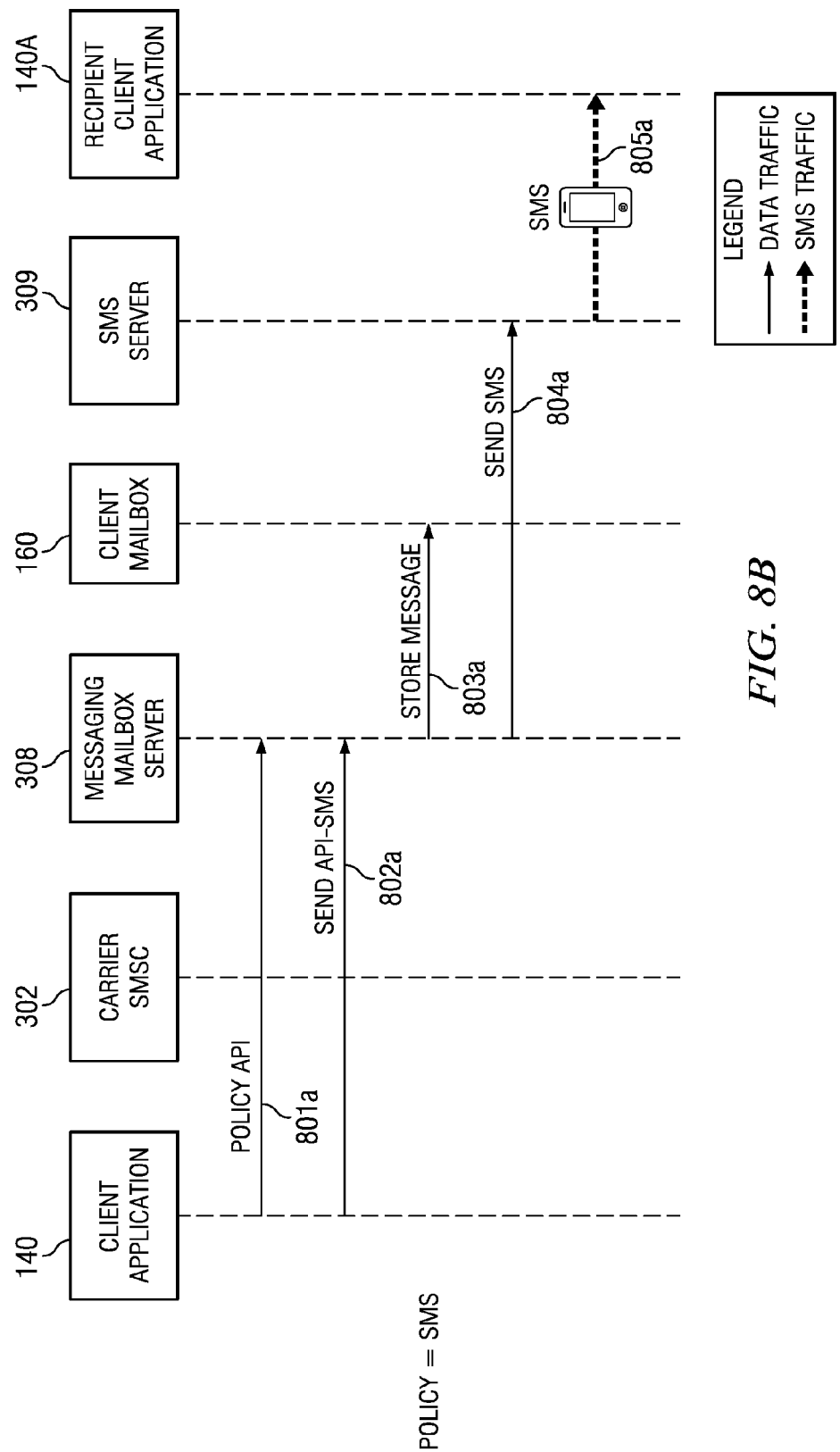
FIG. 8B illustrates an example call flow for transmitting an outgoing message to a recipient's client device via a special bind between the messaging SMS server and carrier SMSC.

FIG. 8B illustrates an example call flow for transmitting an outgoing message to a recipient's client device 140A via a special bind between the messaging SMS server 309 and carrier SMSC 302 or 302A. At Step 801*a*, the messaging client on mobile device 140 queries mailbox server 308 over data channel 312A to obtain a message routing policy by making a REST API call over a TLS connection. If mailbox server 308 responds that the message should be delivered via SMS channel 312B, at Step 802*a*, messaging client on mobile device 140 invokes SendAPI in order to instruct mailbox server 308 to transmit the message to the recipient via SMS message. At Step 803*a*, mailbox server 308 stores the message in the transmitting client's mailbox 160. At Step 804*a*, mailbox server 308 directly transmits a request to SMS server 309 to send the message to the messaging client on mobile device 140A. SMS server 309, at Step 805*a*, transmits an SMS message to recipient mobile device 140A with the "from" field spoofed to reflect transmitting device 140A's mobile number. In particular embodiments, the special bind is with the transmitting carrier SMSC 302, and in particular embodiments the special bind is with the recipient SMSC 302A. In particular embodiments, SMS server 309 has a special bind with an IXC 304 to facilitate sender address spoofing.

In particular embodiments, Steps 801*a* and its response may be omitted, and mailbox server 308 may resolve the delivery policy for a particular user. For example, mobile device 140 may simply invoke SendAPI and transmit the message to mailbox server 308 over data channel 312A. Mailbox server 308 may then resolve the delivery policy for the recipient, and, independent of any further action from mobile device 140, may route the message to mobile device 140A as depicted in steps 803*a*-804*a*.

Figure 9:
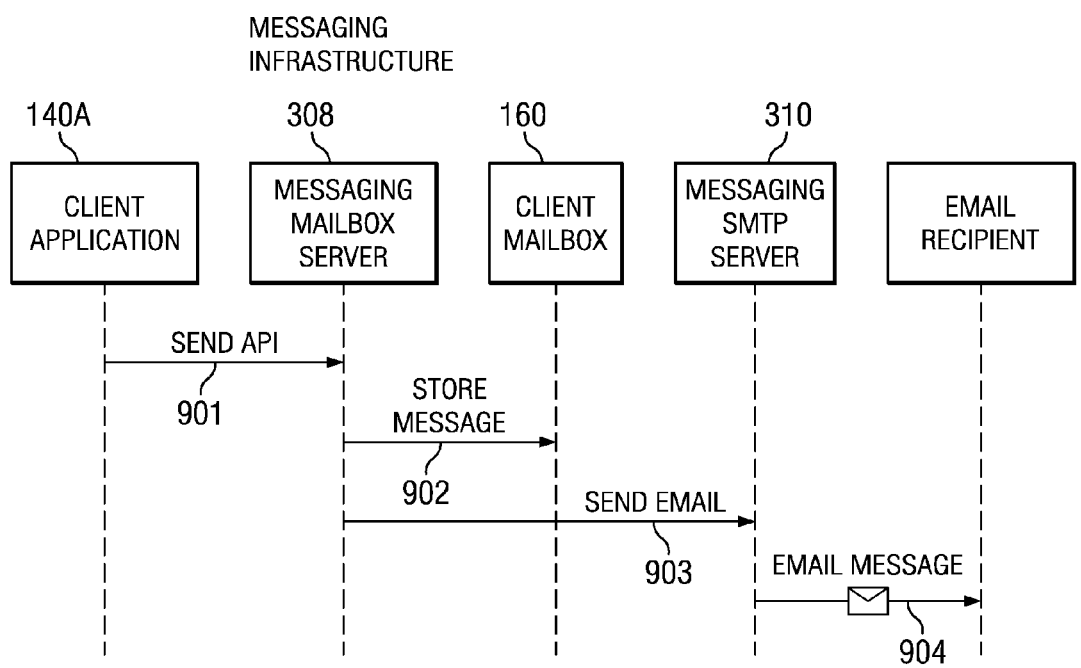
FIG. 9 illustrates an example call flow for transmitting an outgoing message from a messaging client device to an email recipient.

FIG. 9 illustrates an example call flow for transmitting an outgoing message from a messaging client device 140A to an email recipient. At Step 901, the messaging client on mobile device 140 queries mailbox server 308 over data channel 312A to obtain a message routing policy by making a REST API call over a TLS connection. At Step 902, mailbox server 308 stores the message into the mailbox 160 of the transmitting user. At Step 903, mailbox server determines through stored policies for the transmitting or recipient users that the message should be delivered through email, and transmits the message to messaging SMTP server 310. In particular embodiments, mailbox server 308 requests SMTP server 310 to utilize a default social networking email address for the recipient, for example, steve@facebook.com. In particular embodiments, the recipient email address is pulled from the recipient's social networking profile. In particular embodiments, the recipient user may configure policies that dictate message delivery to a particular email address or addresses. In particular embodiments, the recipient user may configure a policy that dictate s message delivery to a particular email address only for particular transmitting users. Step 904, SMTP server 310 transmits the message vial email over Internet 306 to the recipient's inbox. In particular embodiments where the recipient email account is hosted by the social networking system, the message does not need to traverse the public IP network.

Figure 10:
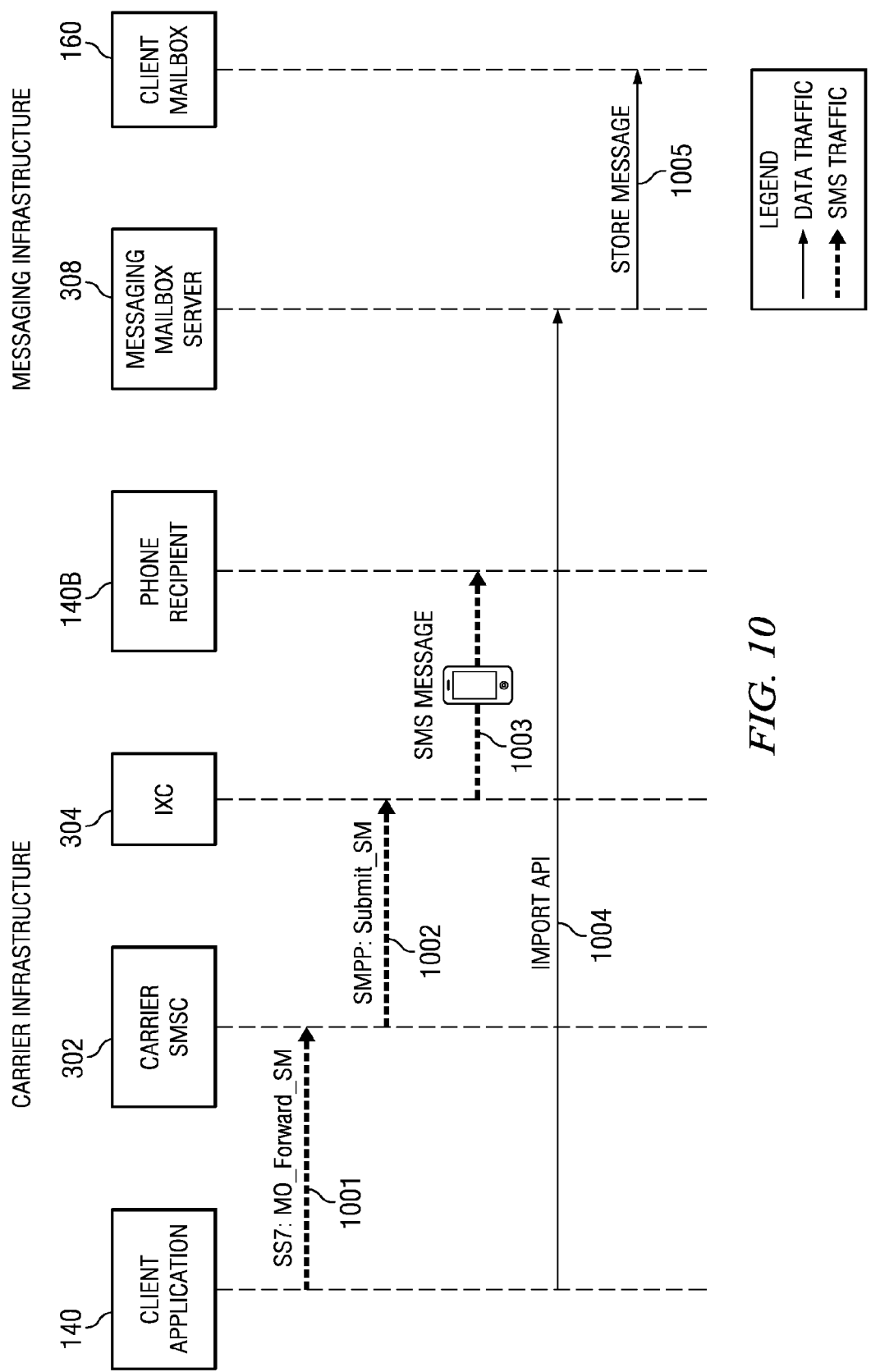
FIG. 10 illustrates an example call flow for transmitting an outgoing message from a messaging client device to a phone number via SMS.

FIG. 10 illustrates an example call flow for transmitting an outgoing message from a messaging client device 140 to a phone number via SMS. The phone number may, without limitation: that of a non-messaging client device 140B, 140C, a land line that accepts SMS messages, a VoIP number provided by a service such as Google Voice, any phone number not linked on the transmitting device or the social networking system with a user identifier, or another SMS short code. At Step 1001, the messaging client on mobile device 140 requests its carrier SMSC 302 to send the message via SMS.

At Step 1002, the transmitting user's carrier SMSC 302 recognizes that the number is for a different carrier, and forwards the SMS to IXC 304. At 1003, the recipient receives the message as an SMS from mobile device 140's number, routed through IXC 304.

In order to keep the transmitting user's mailbox 160 synchronized, at Step 404, the messaging client on mobile device 140 transmits a copy of the message to mailbox 308 and requests it to save the message. In particular embodiments, this is via a REST API call over a TLS connection. At Step 1005, mailbox server 308 stores the message in the transmitting user's mailbox 160.

Figure 11:
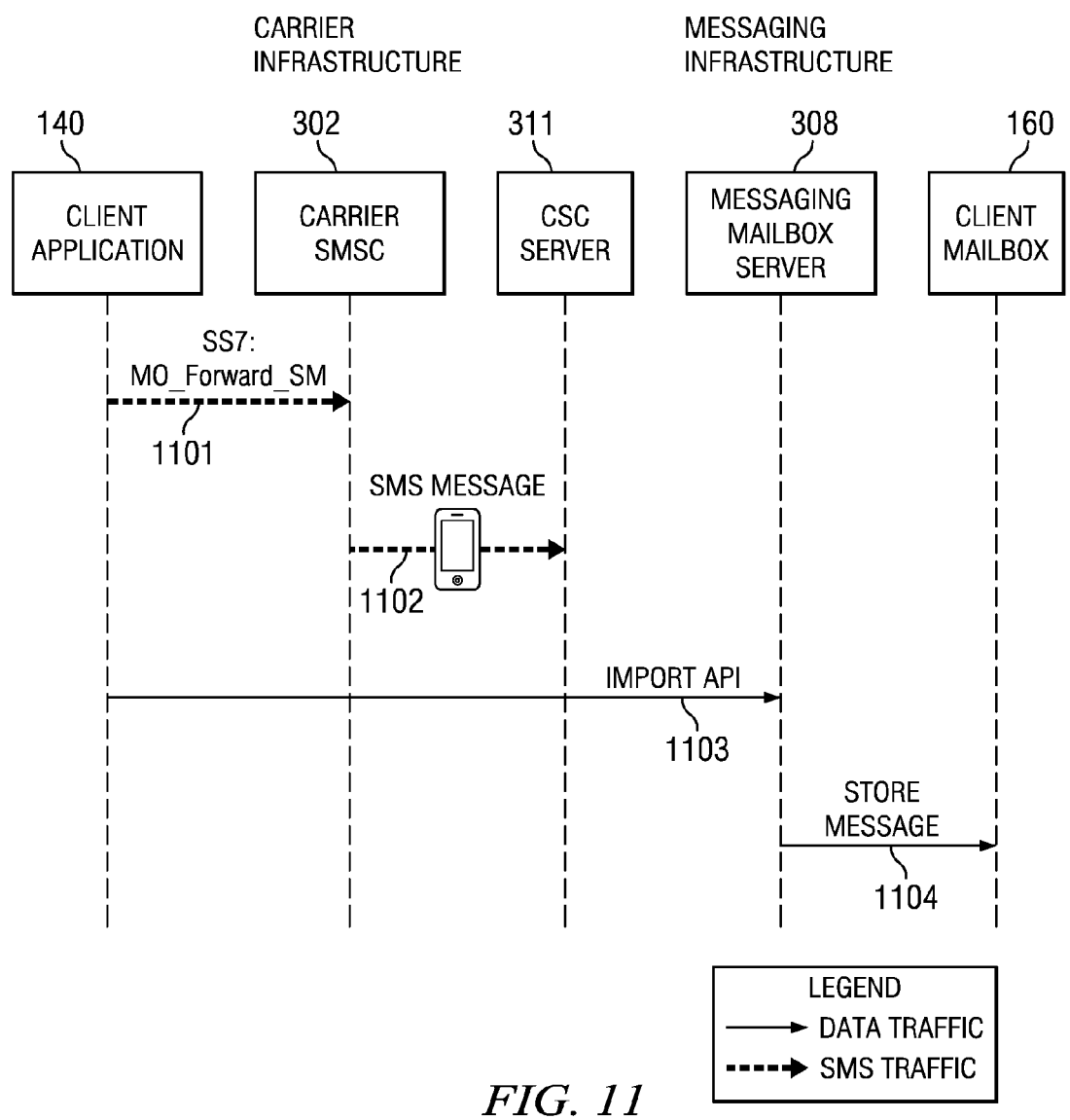
FIG. 11 illustrates an example call flow for transmitting an outgoing message from a messaging client device to a phone number via an SMS shortcode.

FIG. 11 illustrates an example call flow for transmitting an outgoing message from a messaging client device 140 to a phone number via CSC server 311. At Step 1101, the messaging client on mobile device 140 requests its carrier SMSC 302 to send a message via SMS to a particular short-code number, such as 32655. At Step 1102, carrier SMSC 302 transmits the message to CSC server 311. As previously disclosed, CSC 311 may be a separate server from SMS server 309, or merely an application running on SMS Server 309 or another server. At Step 1103, the messaging client on mobile device 140 requests the mailbox server 308 save the message by making a REST API call over a TLS connection. At Step 1104, mailbox server 308 stores the message in the transmitting user's mailbox 160.

Figure 12:
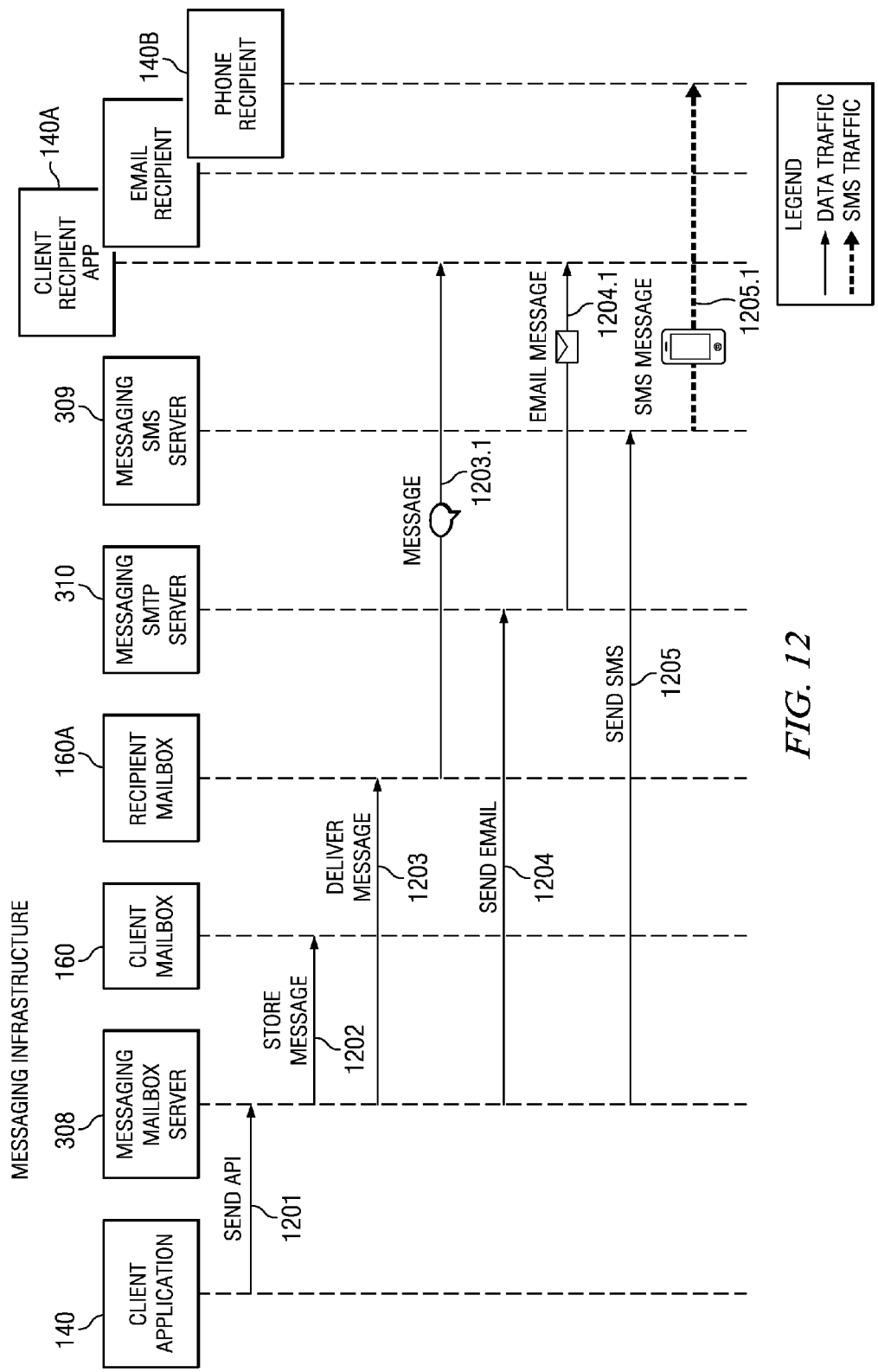
FIG. 12 illustrates an example call flow for transmitting an outgoing message to multiple recipients or via multiple communication channels.

FIG. 12 illustrates an example call flow for transmitting an outgoing message to multiple recipients or via multiple communication channels. At Step 1201, the messaging client on mobile device 140 instructs mailbox server 308 over data channel 312A to transmit the message to multiple users. At Step 1202, mailbox server 308 stores the message in the transmitting user's mailbox 160. At Step 1203, mailbox server 308 delivers the messages to the mailboxes of multiple messaging service recipients, who may view the message through their mobile device 140A or over a web client 150A at Step 1203.1.

At Step 1204, mailbox server transmits a message to SMTP server 310, which then delivers the message as an email at Step 1204.1. At Step 1205, mailbox server routes the message to phone recipients such as 140B through SMS server 309 or CSC server 11 as previously described. In particular embodiments, a user may configure preferences that dictate that they receive messages through multiple communication channels. Thus a user may receive multiple notifications for the same message. Additionally, the application of the method of FIG. 12, as well as channel-agnostic message threading, greatly simplifies group messages. For example, a group of users may maintain an ongoing conversation thread on mailbox 308, even though one or more of the participants are utilizing different clients and communication channels. For example, a participant at work may find utilizing his email client is the most convenient, while a user away from his desk may find using the messaging client on his phone the most convenient. Additionally, a user who does not have data connectivity, but has SMS network connectivity, will not miss messages and may still participate even though he is in a data dead-zone, such as in the woods.

Figure 13:
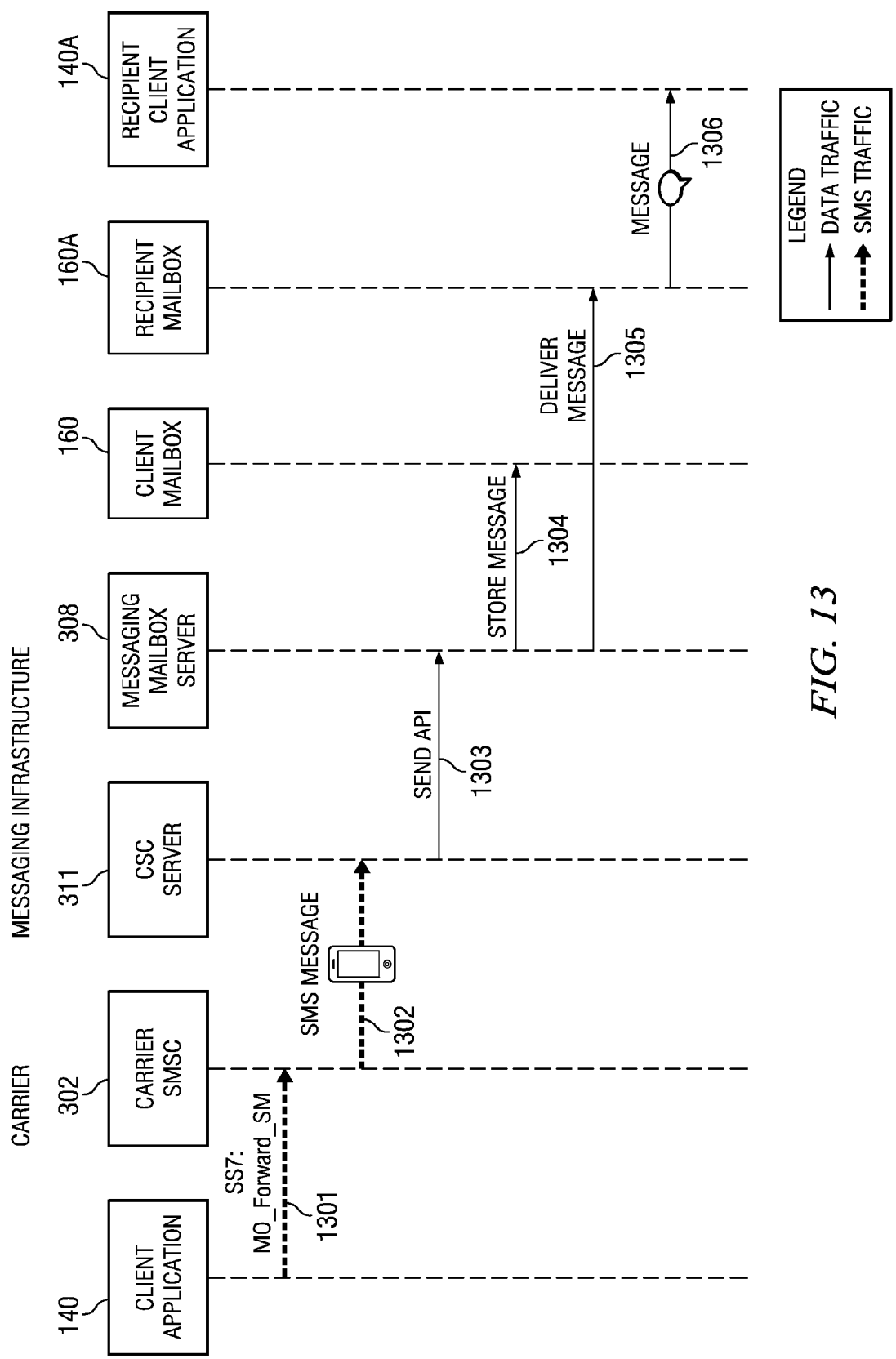
FIG. 13 illustrates an example call flow for transmitting an outgoing message from a messaging client device when no data connection is available.

FIG. 13 illustrates an example call flow for transmitting an outgoing message from a messaging client device 140A when no data connection is available. For example, a user may be in an area where his or her mobile device 140 only has voice/SMS connectivity but no access to the packet switched network. In such a scenario, the messaging client resident on mobile device 140 defaults to using SMS to transmit messages. At Step 1301, the messaging client encodes an outgoing message into an SMS, and requests its carrier SMSC 302 to send the message to CSC server 311. In particular embodiments, this operation is completely transparent to the user; the user does not need to know the number for the shortcode, or even that the message is being transmitted over SMS channel 312B.

At Step 1303, CSC server 311 decodes the SMS and requests mailbox server 308 to transmit the message. At Step 1304, mailbox server 308 stores the message in the outgoing user's mailbox 160. At Step 1305, mailbox server 308 validates the recipient and delivers the message to his or her mailbox. The SMS transmitted to CSC server 11 may include one or more specially formatted identifiers that designate the participants of the conversation. For example, the message may include a thread ID, social networking user IDs for each participant, or phone numbers. Based on the information transmitted in the SMS, mailbox server 308 may need to perform different steps in the validation process. For example, if the SMS contains a thread ID, validation only requires delivering the message to the participants of the thread. As another example, if the SMS contains social networking user IDs, mailbox server 308 needs to deliver a copy of the SMS to each user's mailbox. Finally, if only phone participant phone numbers are included, mailbox server 308 must perform a reverse lookup in order to validate the participants.

At Step 1306, the recipient may access the message via his or her messaging client on mobile device 140A, or via web interface 150A.

Figure 14:
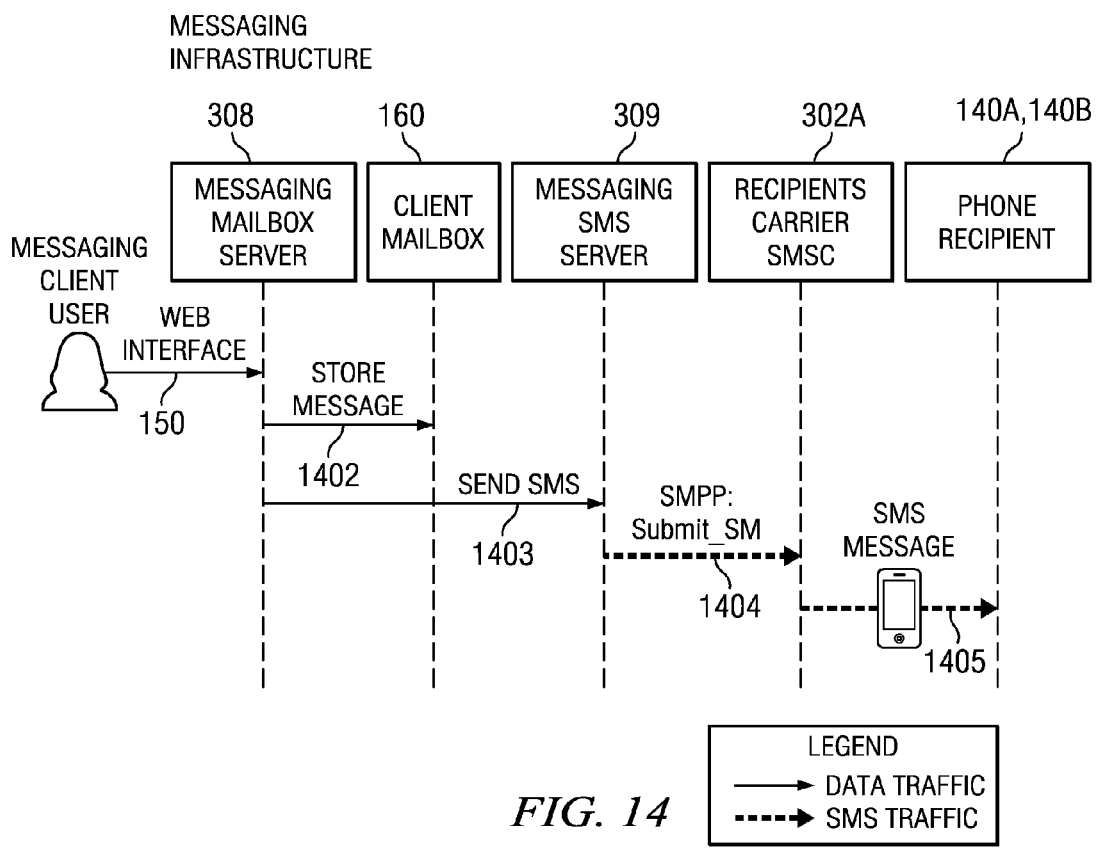
FIG. 14 illustrates an example call flow for transmitting an outgoing message from the web interface of a messaging service to a phone number.

FIG. 14 illustrates an example call flow for transmitting an outgoing message from the web interface 150 of a messaging service to a phone number. At Step 1401, a user accesses his or her mailbox 160 through web interface 150. As previously disclosed, mailbox 160 may be represented as a website or other markup language documents displayed by a browser on web client 150. At Step 1401, the user requests mailbox server 308 to transmit the message to one or more recipients.

At Step 1402, mailbox server 308 stores the message in the transmitting user's mailbox 160, and at Step 1403, mailbox server 308 requests SMS server 309 to send the message as an SMS. At Step 1404, SMS server 309, or alternatively CSC server 311, routes the message over an SMPP bind for the recipient carrier 302A, or to an SMS aggregator. At Step 1405, the recipient device, for example, messaging clients 140A and 140B receives the SMS. Where the SMS is transmitted from CSC server 311, the shortcode appears in the "from" field. Where the SMS is transmitted from SMS server 309, the "from" field is spoofed to display the phone number of the transmitting device 140A, as previously discussed.

Figure 15:
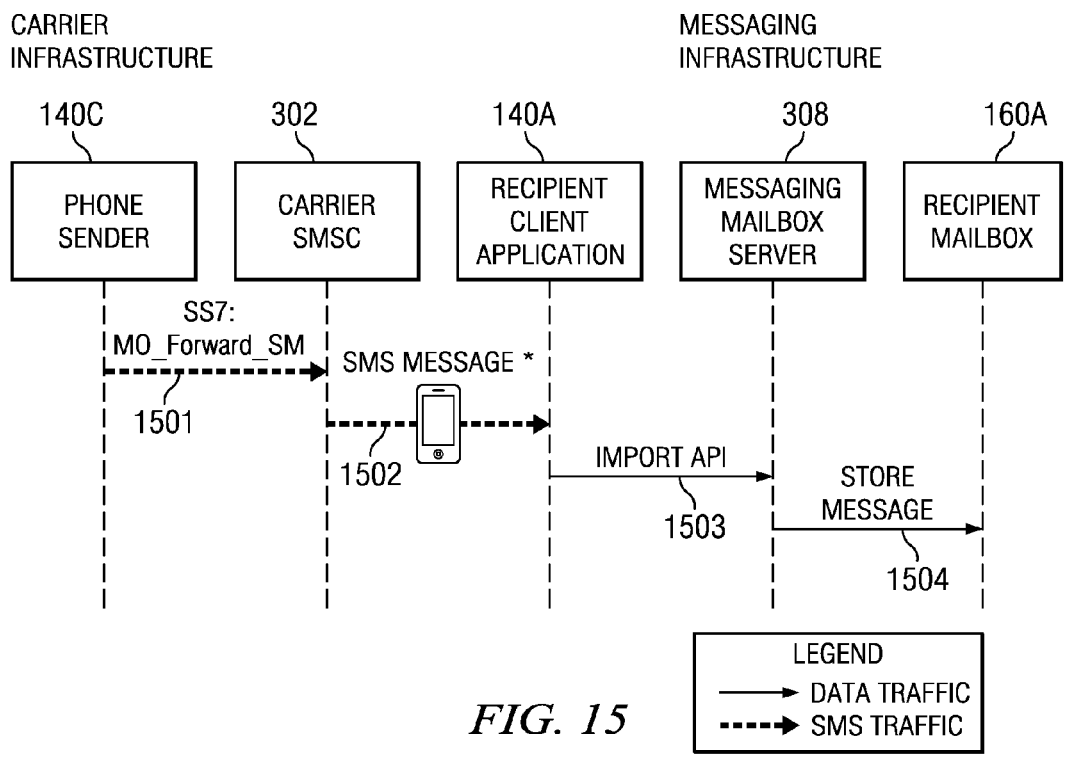
FIG. 15 illustrates an example call flow for receiving an incoming message from a phone number.

FIG. 15 illustrates an example call flow for receiving an incoming message from a non-messaging client device's phone number, for example, mobile device 140B. At Step 1501, the user of mobile device 140B requests its carrier SMSC 302 to transmit an SMS message to the phone number of a messaging client mobile device 140A. At Step 1502, the message is delivered via the recipient SMSC 302A and in particular scenarios, IXC 304. At this point the users of mobile device 140A is notified via his or her messaging client and can view the message on mobile device 140A. In particular embodiments, mobile device 140A then performs the method of FIG. 5 in order to determine whether the message belongs in an existing thread or needs a new thread. As previously described, mobile device 140A creates a message object for transmission to mailbox server 308.

At Step 1503, the messaging client on mobile device 140A requests mailbox server 308 to save the message in the user's mailbox 160A by making a REST API call over a TLS connection. The messaging client on mobile device 140A transmits the message object to mailbox server 308; in particular embodiments, the message object is a JSON objects. At Step 1504, mailbox server stores the message in its corresponding thread, or creates a new thread for the message, in mailbox 160A.

Voicemail Proxy

Figure 16:
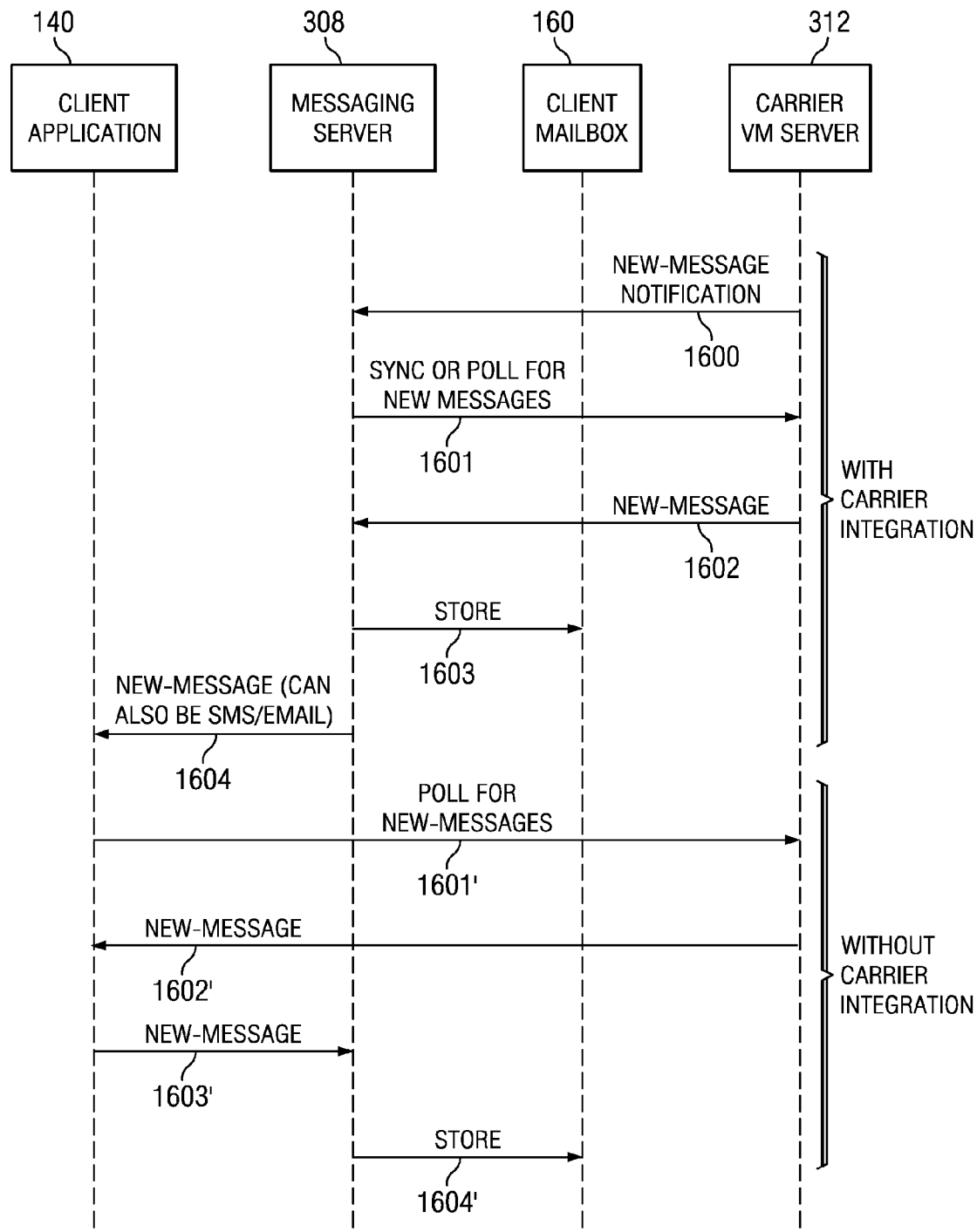
FIG. 16 illustrates an example call flow diagram for retrieving voicemails from a client's voicemail box.

FIG. 16 illustrates an example call flow diagram for retrieving voicemails from a client's voicemail box 312. In particular embodiments, messaging infrastructure 307 is fully integrated with users' carrier voicemail box servers 312 and 312A, and messaging client mobile devices 140, 140A are not involved in the retrieval of new voicemail messages, as seen in steps 1600-1604. In particular embodiments, messaging client mobile devices 140, 140A retrieve new voicemails in a traditional pull fashion, but then transmits the message to messaging infrastructure 307, as seen in Steps 1601' to 1604'.

The method of 1600-1604 requires, in particular embodiments, storage of authentication credentials for voice mailbox 312 in messaging infrastructure 307. For example, when a user initially configures his or her messaging client, the client application may prompt the user to enter his authentication credentials for his or her voice mailbox. In particular embodiments, the authentication credentials comprise a pin number. In particular embodiments, the authentication credentials comprise an email address and password. This disclosure contemplates any suitable method of authenticating a user for accessing a voice mailbox. Upon receiving the authentication credentials, mailbox server 308, or another server within messaging infrastructure 307, stores the authentication credentials in association with the social networking user account for the mobile device.

At Step 1601, messaging server 308 periodically polls the user's voicemail server 312 over the public IP network 306. In particular embodiments, mailbox server 308 transmits the authentication credentials along with this request. In particular embodiments, mailbox server polls voicemail server 312 at predetermined intervals, such as, for example, 30 minutes. In particular embodiments, the user may set the predetermined interval. This disclosure contemplates any suitable method of polling voicemail server 312 from mailbox server 308. In particular embodiments, messaging server 308 may utilize both polling of voicemail server 312 as well as receiving messages from client device 140. In particular embodiments, voicemail server 312 may push notifications to client device 140 between polls, as discussed in further detail with reference to Step 1600. Utilizing both polling and client notification ensures that messaging server 308 receives a new message notification as soon as a new message arrives.

At Step 1602, voicemail server 312 responds, after authenticating that mailbox server 308 has access to the user's voice mailbox, that there are one or more new voicemails in the user's voice mailbox. Additionally at Step 1602, mailbox server 308 downloads the new voicemails over public IP network 306. In particular embodiments, voicemail servers 312, 312A may be unconnected to the public IP network 306, that is, they may be part of a carrier intranet. In such embodiments, a specialized network gateway may be installed between mailbox server 308 and voicemail server 312. This disclosure contemplates any suitable method of integrating with external voicemail servers, regardless of whether the servers are hosted on private intranet, behind corporate firewalls, etc.

At Step 1603, mailbox server 308 stores the new voicemail or voicemails in the user's mailbox 160. In particular embodiments, the voicemail is an audio file that may be downloaded and played either at mobile device 140 or over web interface 150. In particular embodiments, the voicemail is a link to an audio file stored on an external server. In particular embodiments, mailbox server 308 performs speech-to-text transcription, and the voicemail is stored as a text transcript. This disclosure contemplates any suitable method of storing or processing voicemails downloaded from the user's carrier voice mailbox.

At Step 1604, mailbox server 308 delivers the voicemail to mobile device 140. Mailbox server 308 may utilize any delivery channel, either data channel 312a or SMS channel 312B, to deliver the voicemail. As described above, the voicemail may be delivered as an audio file, a link to an audio file, or a text transcription of the voicemail. In particular embodiments, where the voicemail is delivered to mobile device 140 via SMS channel 312B, the voicemail is delivered as a text transcription, or an MMS message. MMS messages are well-known in the art and will not be further discussed here.

The method of Steps 1601 through 1604 permits users to access their voicemail at any time, even when their device lacks a connection to their carrier voice mailbox server. For example, a user traveling on a plane will generally shut off his or her mobile device due to federal regulations or lack of connectivity. If the user is on a flight offering in-flight WiFi, the user may still access his or her voicemail through web interface 150. Thus the user may still check and receive voicemails even when mobile device 140 has no connectivity.

In particular embodiments, new message notifications may be pushed via an SMS channel or other communications channel directly from voicemail server 312 to messaging server 308. For example, when a new message arrives at voicemail server 312, voicemail server 312 may transmit a notification, either as an SMS or data packet, to messaging server 308 immediately upon reception of the voicemail at Step 1600. In response, mailbox server 308 may, at Step 1601, issue a "synchronize" or "sync" request to voicemail server 312, requesting that any new messages be transmitted to mailbox server 308. In such embodiments, after the synch request is processed by voicemail server 312, the message is pushed down in Step 1602 as previously discussed.

In particular scenarios, carrier voicemail servers 312, 312A are not connected to the public IP network, and are unwilling to install a connection from their voice mailbox servers to mailbox server 308. In such situations, mobile device 140 first pulls down the voicemail from its voice mailbox server 312 and then transmits it to mailbox server 308.

At Step 1601', mobile device 140 polls voicemail server 312 for new messages. In particular embodiments, the messaging client application provides authentication credentials to the voicemail server 312. In particular embodiments, voicemail server 312 transmits a notification to mobile device 140a when a new message has arrived. Such implementations are carrier-specific and will not be discussed further here. This disclosure contemplates any suitable method of checking for new message at a voicemail server. At Step 1602', voicemail server 312 notifies mobile device 140 that there are one or more new voicemails in the user's voice mailbox, and transmits the voicemail to the user. At this point, the user may listen to the voicemail on his or her mobile device 140.

At Step 1603', the messaging client on mobile device 140 transmits the voicemail to mailbox server 308 and requests its storage in the user's mailbox 160. At Step 1604', mailbox server 308 stores the message in the user's mailbox 160, and performs any necessary processing or transcription as previously described.

As previously described with regard to step 1600; voicemail server 312 may utilize a "push-synchronize" model rather than the "poll-pull" model as depicted in FIG. 16. For example, upon receiving a new voicemail for the user account associated with mobile device 140, voicemail server 312 may transmit a push notification to mobile device 140 that a new message has arrived. As discussed, the push notification may, in particular embodiments, be transmitted through an SMS channel, or other persistent TCP/IP connection. In response, mobile device 140 may issue a synchronize request to mailbox server 312, which in turn transmits the new message to mobile device 140. This disclosure contemplates any suitable mechanism of informing mobile device 140 of new messages, and any method of delivery of the new messages.

Figure 17:
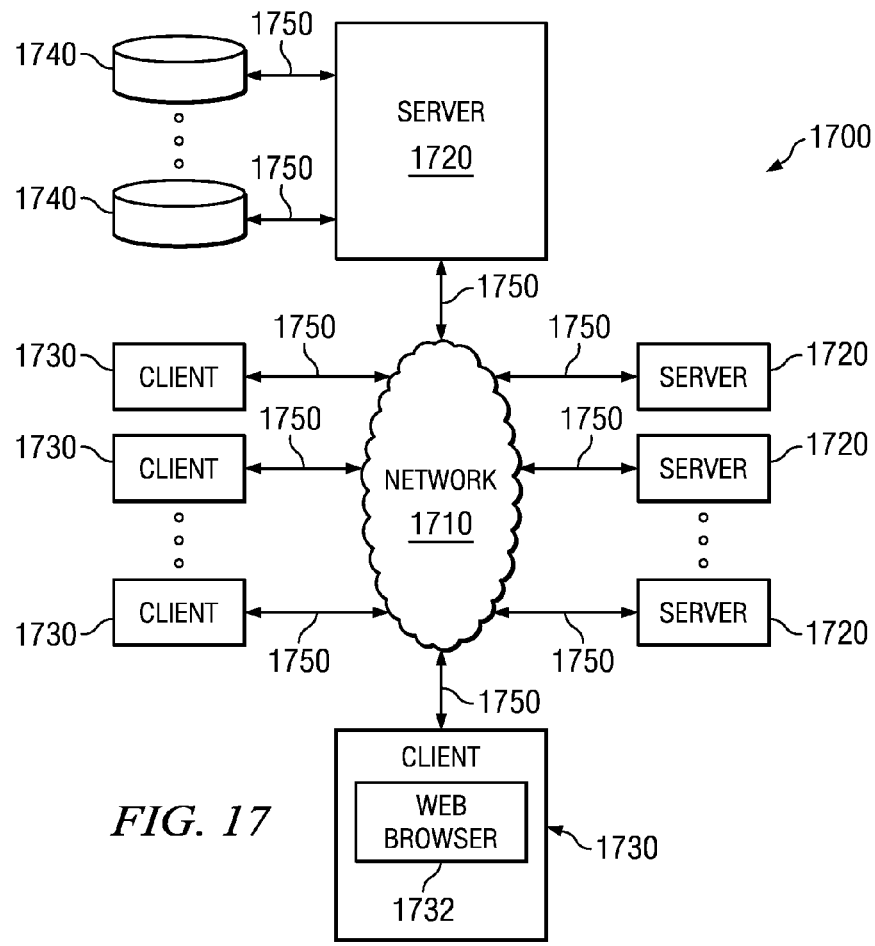
FIG. 17 illustrates an example network environment.

While the foregoing embodiments may be implemented in a variety of network configurations, the following illustrates an example network environment for didactic, and not limiting, purposes. FIG. 17 illustrates an example network environment 1700. Network environment 1700 includes a network 1710 coupling one or more servers 1720 and one or more clients 1730 to each other. Network environment 1700 also includes one or more data storage 1740 linked to one or more servers 1720. Particular embodiments may be implemented in network environment 1700. For example, social networking system frontend 120 may be written in software programs hosted by one or more servers 1720. For example, event database 102 may be stored in one or more storage 1740. In particular embodiments, network 1710 is an intranet, an extranet, a virtual private network (VPN), a local area network (LAN), a wireless LAN (WLAN), a wide area network (WAN), a metropolitan area network (MAN), a portion of the Internet, or another network 1710 or a combination of two or more such networks 1710. The present disclosure contemplates any suitable network 1710.

One or more links 1750 couple a server 1720 or a client 1730 to network 1710. In particular embodiments, one or more links 1750 each includes one or more wired, wireless, or optical links 1750. In particular embodiments, one or more links 1750 each includes an intranet, an extranet, a VPN, a LAN, a WLAN, a WAN, a MAN, a portion of the Internet, or another link 1750 or a combination of two or more such links 1750. The present disclosure contemplates any suitable links 1750 coupling servers 1720 and clients 1730 to network 1710.

In particular embodiments, each server 1720 may be a unitary server or may be a distributed server spanning multiple computers or multiple datacenters. Servers 1720 may be of various types, such as, for example and without limitation, web server, news server, mail server, message server, advertising server, file server, application server, exchange server, database server, or proxy server. In particular embodiments, each server 1720 may include hardware, software, or embedded logic components or a combination of two or more such components for carrying out the appropriate functionalities implemented or supported by server 1720. For example, a web server is generally capable of hosting websites containing web pages or particular elements of web pages. More specifically, a web server may host HTML files or other file types, or may dynamically create or constitute files upon a request, and communicate them to clients 1730 in response to HTTP or other requests from clients 1730. A mail server is generally capable of providing electronic mail services to various clients 1730. A database server is generally capable of providing an interface for managing data stored in one or more data stores.

In particular embodiments, one or more data storages 1740 may be communicatively linked to one or more servers 1720 via one or more links 1750. In particular embodiments, data storages 1740 may be used to store various types of information. In particular embodiments, the information stored in data storages 1740 may be organized according to specific data structures. In particular embodiment, each data storage 1740 may be a relational database. Particular embodiments may provide interfaces that enable servers 1720 or clients 1730 to manage, e.g., retrieve, modify, add, or delete, the information stored in data storage 1740.

In particular embodiments, each client 1730 may be an electronic device including hardware, software, or embedded logic components or a combination of two or more such components and capable of carrying out the appropriate functions implemented or supported by client 1730. For example and without limitation, a client 1730 may be a desktop computer system, a notebook computer system, a netbook computer system, a handheld electronic device, or a mobile telephone. The present disclosure contemplates any suitable clients 1730. A client 1730 may enable a network user at client 1730 to access network 1730. A client 1730 may enable its user to communicate with other users at other clients 1730.

A client 1730 may have a web browser 1732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 1730 may enter a Uniform Resource Locator (URL) or other address directing the web browser 1732 to a server 1720, and the web browser 1732 may generate a Hyper Text Transfer Protocol (HTTP) request and communicate the HTTP request to server 1720. Server 1720 may accept the HTTP request and communicate to client 1730 one or more Hyper Text Markup Language (HTML) files responsive to the HTTP request. Client 1730 may render a web page based on the HTML files from server 1720 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 18:
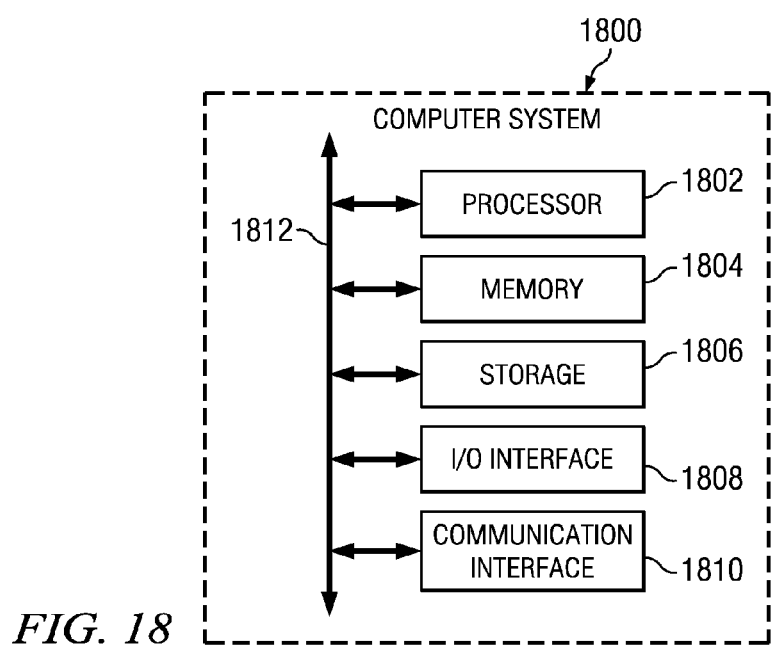
FIG. 18 illustrates an example computing system.

FIG. 18 illustrates an example computer system 1800, which may be used with some embodiments. This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1800 may include one or more computer systems 1800; be unitary or distributed; span multiple locations; span multiple machines; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. The present disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. The present disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1804 may include one or more memories 1802, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include an HDD, a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form.

Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate. This disclosure contemplates one or more computer-readable storage media implementing any suitable storage. In particular embodiments, a computer-readable storage medium implements one or more portions of processor 1802 (such as, for example, one or more internal registers or caches), one or more portions of memory 1804, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that this disclosure may be used with any electronic social network service and, even if it is not provided through a website. Any computer-based system that provides social networking functionality can be used even if it relies, for example, on e-mail, instant messaging or other form of peer-to-peer communications, and any other technique for communicating between users. This disclosure is thus not limited to any particular type of communication system, network, protocol, format or application.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Particular embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present application has been explained with reference to specific embodiments. For example, while particular embodiments have been described as operating in connection with a social network system, particular embodiments can be used in connection with any communications facility that allows for communication of messages between users, such as an email hosting site. Other embodiments will be evident to those of ordinary skill in the art. It is therefore not intended that the present disclosure be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
by one or more server computing devices of a system, receiving from a client:
an identifier of a voice mailbox associated with the client and external to the system; and
a set of authentication credentials for the voice mailbox;
by one or more server computing devices of the system, storing the identifier and authentication credentials in association with information identifying a first user associated with the client, wherein the first user is associated with a first node on a social-networking system;
by one or more server computing devices of the system, retrieving one or more messages from the voice mailbox using the identifier and the authentication credentials, wherein each of the messages comprises information identifying a second user who sent the message; and
by one or more server computing devices of the system, adding one or more of the retrieved messages to one or more conversation threads maintained by the system, wherein at least one of the conversation threads comprises at least one message exchanged between the first user and the second user using a different communication channel, wherein the second user is represented by a second node on the social-networking system, and wherein the first node is connected through the social-networking system to the second node, and wherein the adding comprises, for each of the one or more of the messages:
searching a database of conversation threads, each conversation thread comprising a plurality of participants, for a conversation thread between the first user and a sender of the message;
if a matching thread is identified, then adding the message to the thread; and
if a matching thread is not identified, then creating a new thread associated with the first user, and adding the message to the new thread.

2. The method of claim 1, retrieving one or more messages from the voice mailbox comprising:
receiving a notification from the client of a new voice mailbox state;
connecting to the voice mailbox; and
downloading any new voicemails.

3. The method of claim 1, retrieving one or more messages from the voice mailbox comprising:
receiving a downloaded voicemail from the client.

4. The method of claim 1, retrieving one or more messages from the voice mailbox comprising:
periodically polling the voice mailbox for new voicemails; and
in response to detecting a new voicemail, downloading the new voicemail.

5. The method of claim 1, retrieving one or more messages from the voice mailbox comprising:
receiving a notification from the voice mailbox of a new voice mailbox state;
connecting to the voice mailbox and requesting a synchronization operation; and
downloading any new voicemails.

6. The method of claim 3, periodically polling the voice mailbox comprising:
polling the voice mailbox once a day.

7. The method of claim 3, periodically polling the voice mailbox comprising:
polling the voice mailbox when there is no data connectivity with the client.

8. The method of claim 1, wherein adding the message to a thread comprises adding the text of the message obtained via speech-to-text processing to the thread.

9. A non-transitory, computer-readable media comprising instructions operable, when executed by one or more server computing devices of a system, to:
receive from a client:
an identifier of a voice mailbox associated with the client and external to the system; and
a set of authentication credentials for the voice mailbox;
store the identifier and authentication credentials in association with information identifying a first user associated with the client, wherein the first user is associated with a first node on a social-networking system;
retrieve one or more messages from the voice mailbox using the identifier and the authentication credentials, wherein each of the messages comprises information identifying a second user who sent the message; and
add one or more of the retrieved messages to one or more conversation threads maintained by the system, wherein at least one of the conversation threads comprises at least one message exchanged between the first user and the second user using a different communication channel, wherein the second user is represented by a second node on the social-networking system, and wherein the first node is connected through the social-networking system to the second node, and wherein the adding comprises, for each of the one or more of the messages:
searching a database of conversation threads, each conversation thread comprising a plurality of participants, for a conversation thread between the first user and a sender of the message;
if a matching thread is identified, then adding the message to the thread; and
if a matching thread is not identified, then creating a new thread associated with the first user, and adding the message to the new thread.

10. The media of claim 9, retrieving one or more messages from the voice mailbox comprising:
receiving a notification from the client of a new voice mailbox state;
connecting to the voice mailbox; and
downloading any new voicemails.

11. The media of claim 9, retrieving one or more messages from the voice mailbox comprising:
receiving a downloaded voicemail from the client.

12. The media of claim 9, retrieving one or more messages from the voice mailbox comprising:
periodically polling the voice mailbox for new voicemails; and
in response detecting a new voicemail, downloading the new voicemail.

13. The media of claim 9, retrieving one or more messages from the voice mailbox comprising:
receiving a notification from the voice mailbox of a new voice mailbox state;
connecting to the voice mailbox and requesting a synchronization operation; and
downloading any new voicemails.

14. The media of claim 11, periodically polling the voice mailbox comprising:
polling the voice mailbox once a day.

15. The media of claim 11, periodically polling the voice mailbox comprising:
polling the voice mailbox when there is no data connectivity with the client.

16. The media of claim 9, wherein adding the retrieved messages to a thread comprises adding the text of the message obtained via speech-to-text processing to the thread.

17. A system comprising:
one or more processors;
a memory coupled to the processors comprising instructions operable, when executed by the processors, to:
receive from a client:
an identifier of a voice mailbox associated with the client and external to the system; and
a set of authentication credentials for the voice mailbox;
store the identifier and authentication credentials in association with information identifying a first user associated with the client, wherein the first user is associated with a first node on a social-networking system;
retrieve one or more messages from the voice mailbox using the identifier and the authentication credentials, wherein each of the messages comprises information identifying a second user who sent the message; and
add one or more of the retrieved messages to one or more conversation threads maintained by the system, wherein at least one of the conversation threads comprises at least one message exchanged between the first user and the second user using a different communication channel, wherein the second user is represented by a second node on the social-networking system, and wherein the first node is connected through the social-networking system to the second node, wherein the adding comprises, for each of the one or more of the messages:
searching a database of conversation threads, each conversation thread comprising a plurality of participants, for a conversation thread between the first user and a sender of the message;
if a matching thread is identified, then adding the message to the thread; and
if a matching thread is not identified, then creating a new thread associated with the first user, and adding the message to the new thread.

18. The system of claim 17, retrieving one or more messages from the voice mailbox comprising:
receiving a notification from the voice mailbox of a new voice mailbox state;
connecting to the voice mailbox and requesting a synchronization operation; and
downloading any new voicemails.

* * * * *